(12) United States Patent
Kliner et al.

(10) Patent No.: US 10,916,908 B2
(45) Date of Patent: Feb. 9, 2021

(54) HIGH-POWER, SINGLE-MODE FIBER SOURCES

(71) Applicant: NLIGHT, INC., Vancouver, WA (US)

(72) Inventors: Dahv A. V. Kliner, Portland, OR (US); Roger L. Farrow, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 16/711,174

(22) Filed: Dec. 11, 2019

(65) Prior Publication Data

US 2020/0119513 A1  Apr. 16, 2020

Related U.S. Application Data

(63) Continuation of application No. 15/180,506, filed on Nov. 13, 2017, now Pat. No. 10,535,973, which is a
(Continued)

(51) Int. Cl.
*H01S 3/067* (2006.01)
*H01S 3/08* (2006.01)
*H01S 3/094* (2006.01)

(52) U.S. Cl.
CPC ........ *H01S 3/06729* (2013.01); *H01S 3/0675* (2013.01); *H01S 3/08045* (2013.01);
(Continued)

(58) Field of Classification Search
CPC ............... H01S 3/06729; H01S 3/0675; H01S 3/08045; H01S 3/094007; H01S 3/06733; H01S 3/09408
See application file for complete search history.

(56) References Cited

U.S. PATENT DOCUMENTS

| 3,388,461 A | 6/1968 | Lins |
| 4,138,190 A | 2/1979 | Bryngdahl |

(Continued)

FOREIGN PATENT DOCUMENTS

| BY | 12235 | 8/2009 |
| CN | 1212056 | 3/1999 |

(Continued)

OTHER PUBLICATIONS

Tam et al., "An imaging fiber-based optical tweezer array for microparticle array assembly," Appl. Phys. Lett., 84:4289-4291 (May 7, 2004).
(Continued)

*Primary Examiner* — Armando Rodriguez
(74) *Attorney, Agent, or Firm* — Michelle Craig (57) ABSTRACT

An optical apparatus includes one or more pump sources situated to provide laser pump light, and a gain fiber optically coupled to the one or more pump sources, the gain fiber including an actively doped core situated to produce an output beam, an inner cladding and outer cladding surrounding the doped core and situated to propagate pump light, and a polymer cladding surrounding the outer cladding and situated to guide a selected portion of the pump light coupled into the inner and outer claddings of the gain fiber. Methods of pumping a fiber sources include generating pump light from one or more pump sources, coupling the pump light into a glass inner cladding and a glass outer cladding of a gain fiber of the fiber source such that a portion of the pump light is guided by a polymer cladding surrounding the glass outer cladding, and generating a single-mode output beam from the gain fiber.

4 Claims, 3 Drawing Sheets

Related U.S. Application Data continuation of application No. 15/004,680, filed on Jan. 22, 2016, now Pat. No. 9,837,783.

(60) Provisional application No. 62/108,015, filed on Jan. 26, 2015.

(52) U.S. Cl.
CPC .... *H01S 3/094007* (2013.01); *H01S 3/06733* (2013.01); *H01S 3/09408* (2013.01)

(56) References Cited

U.S. PATENT DOCUMENTS

| | | | |
|---|---|---|---|
| 4,252,403 A | 2/1981 | Salisbury | |
| 4,266,851 A | 5/1981 | Salisbury | |
| 4,475,027 A | 10/1984 | Pressley | |
| 4,475,789 A | 10/1984 | Kahn | |
| 4,713,518 A | 12/1987 | Yamazaki et al. | |
| 4,863,538 A | 9/1989 | Deckard | |
| 4,953,947 A | 9/1990 | Bhagavatula | |
| 4,998,797 A | 3/1991 | van den Bergh et al. | |
| 5,008,555 A | 4/1991 | Mundy | |
| 5,082,349 A | 1/1992 | Cordova-Plaza et al. | |
| 5,129,014 A | 7/1992 | Bloomberg | |
| 5,153,773 A | 10/1992 | Muraki et al. | |
| 5,231,464 A | 7/1993 | Ichimura et al. | |
| 5,237,150 A | 8/1993 | Karube | |
| 5,252,991 A | 10/1993 | Storlie et al. | |
| 5,319,195 A | 6/1994 | Jones et al. | |
| 5,463,497 A | 10/1995 | Muraki et al. | |
| 5,475,415 A | 12/1995 | Noethen | |
| 5,475,704 A | 12/1995 | Lomashevich | |
| 5,509,597 A | 4/1996 | Laferriere | |
| 5,523,543 A | 6/1996 | Hunter, Jr. et al. | |
| 5,566,196 A | 10/1996 | Scifres | |
| 5,642,198 A | 6/1997 | Long | |
| 5,684,642 A | 11/1997 | Zumoto et al. | |
| 5,719,386 A | 2/1998 | Hsieh et al. | |
| 5,745,284 A | 4/1998 | Goldberg et al. | |
| 5,748,824 A | 5/1998 | Smith | |
| 5,761,234 A | 6/1998 | Craig et al. | |
| 5,818,630 A | 10/1998 | Fermann et al. | |
| 5,832,415 A | 11/1998 | Wilkening et al. | |
| 5,841,465 A | 11/1998 | Fukunaga et al. | |
| 5,864,430 A | 1/1999 | Dickey et al. | |
| 5,903,696 A | 5/1999 | Krivoshlykov | |
| 5,909,306 A | 6/1999 | Goldberg et al. | |
| 5,932,119 A | 8/1999 | Kaplan et al. | |
| 5,986,807 A | 11/1999 | Fork | |
| 5,999,548 A | 12/1999 | Mori et al. | |
| 6,072,184 A | 6/2000 | Okino et al. | |
| 6,132,104 A | 10/2000 | Bliss et al. | |
| 6,265,710 B1 | 7/2001 | Walter | |
| 6,275,630 B1 | 8/2001 | Yang et al. | |
| 6,310,995 B1 | 10/2001 | Saini et al. | |
| 6,330,382 B1 | 12/2001 | Harshbarger et al. | |
| RE37,585 E | 3/2002 | Mourou et al. | |
| 6,353,203 B1 | 3/2002 | Hokodate et al. | |
| 6,362,004 B1 | 3/2002 | Noblett | |
| 6,417,963 B1 | 7/2002 | Ohishi et al. | |
| 6,426,840 B1 | 7/2002 | Partanen et al. | |
| 6,433,301 B1 | 8/2002 | Dunsky et al. | |
| 6,434,177 B1 | 8/2002 | Jurgensen | |
| 6,434,302 B1 | 8/2002 | Fidric et al. | |
| 6,483,973 B1 | 11/2002 | Mazzarese et al. | |
| 6,490,376 B1 | 12/2002 | Au et al. | |
| 6,496,301 B1 | 12/2002 | Koplow et al. | |
| 6,542,665 B2 | 4/2003 | Reed et al. | |
| 6,556,340 B1 | 4/2003 | Wysocki et al. | |
| 6,569,382 B1 | 5/2003 | Edman et al. | |
| 6,577,314 B1 | 6/2003 | Yoshida et al. | |
| 6,639,177 B2 | 10/2003 | Ehrmann et al. | |
| 6,671,293 B2 | 12/2003 | Kopp et al. | |
| 6,711,918 B1 | 3/2004 | Kliner et al. | |
| 6,724,528 B2 | 4/2004 | Koplow et al. | |
| 6,772,611 B2 | 8/2004 | Kliner et al. | |
| 6,777,645 B2 | 8/2004 | Ehrmann et al. | |
| 6,779,364 B2 | 8/2004 | Tankala et al. | |
| 6,801,550 B1 | 10/2004 | Snell et al. | |
| 6,819,815 B1 | 11/2004 | Corbalis et al. | |
| 6,825,974 B2 | 11/2004 | Kliner et al. | |
| 6,839,163 B1 | 1/2005 | Jakobson et al. | |
| 6,882,786 B1 | 4/2005 | Kliner et al. | |
| 6,895,154 B2 | 5/2005 | Johnson et al. | |
| 6,917,742 B2 | 7/2005 | Po | |
| 6,941,053 B2 | 9/2005 | Lauzon et al. | |
| 6,963,062 B2 | 11/2005 | Cyr et al. | |
| 6,989,508 B2 | 1/2006 | Ehrmann et al. | |
| 7,068,900 B2 | 6/2006 | Croteau et al. | |
| 7,079,566 B2 | 7/2006 | Kido et al. | |
| 7,099,533 B1 | 8/2006 | Chenard | |
| 7,099,535 B2 | 8/2006 | Bhagavatula et al. | |
| 7,116,887 B2 | 10/2006 | Farroni et al. | |
| 7,146,073 B2 | 12/2006 | Wan | |
| 7,148,447 B2 | 12/2006 | Ehrmann et al. | |
| 7,151,787 B2 | 12/2006 | Kulp et al. | |
| 7,151,788 B2 | 12/2006 | Imakado et al. | |
| 7,157,661 B2 | 1/2007 | Amako | |
| 7,170,913 B2 | 1/2007 | Araujo et al. | |
| 7,174,078 B2 | 2/2007 | Libori et al. | |
| 7,184,630 B2 | 2/2007 | Kwon et al. | |
| 7,193,771 B1 | 3/2007 | Smith et al. | |
| 7,196,339 B2 | 3/2007 | Namba et al. | |
| 7,218,440 B2 | 5/2007 | Green | |
| 7,231,063 B2 | 6/2007 | Naimark | |
| 7,235,150 B2 | 6/2007 | Bischel et al. | |
| 7,257,293 B1 | 8/2007 | Fini et al. | |
| 7,317,857 B2 | 1/2008 | Manyam et al. | |
| 7,318,450 B2 | 1/2008 | Nobili | |
| 7,349,123 B2 | 3/2008 | Clarke et al. | |
| 7,359,604 B2 | 4/2008 | Po | |
| 7,373,070 B2 | 5/2008 | Wetter et al. | |
| 7,382,389 B2 | 6/2008 | Cordingley et al. | |
| 7,394,476 B2 | 7/2008 | Cordingley et al. | |
| 7,421,175 B2 | 9/2008 | Varnham | |
| 7,463,805 B2 | 12/2008 | Li et al. | |
| 7,526,166 B2 | 4/2009 | Bookbinder et al. | |
| 7,527,977 B1 | 5/2009 | Fruetel et al. | |
| 7,537,395 B2 | 5/2009 | Savage-Leuchs | |
| 7,592,568 B2 | 9/2009 | Varnham et al. | |
| 7,593,435 B2 | 9/2009 | Gapontsev et al. | |
| 7,622,710 B2 | 11/2009 | Gluckstad | |
| 7,628,865 B2 | 12/2009 | Singh | |
| 7,748,913 B2 | 7/2010 | Oba | |
| 7,764,854 B2 | 7/2010 | Fini | |
| 7,781,778 B2 | 8/2010 | Moon et al. | |
| 7,783,149 B2 | 8/2010 | Fini | |
| 7,835,608 B2 | 11/2010 | Minelly et al. | |
| 7,839,901 B2 | 11/2010 | Meleshkevich et al. | |
| 7,876,495 B1 | 1/2011 | Minelly | |
| 7,880,961 B1 | 2/2011 | Feve et al. | |
| 7,920,767 B2 | 4/2011 | Fini | |
| 7,924,500 B1 | 4/2011 | Minelly | |
| 7,925,125 B2 | 4/2011 | Cyr et al. | |
| 7,955,905 B2 | 6/2011 | Cordingley et al. | |
| 7,955,906 B2 | 6/2011 | Cordingley et al. | |
| 8,027,555 B1 | 9/2011 | Kliner et al. | |
| 8,071,912 B2 | 12/2011 | Costin, Sr. et al. | |
| 8,184,363 B2 | 5/2012 | Rothenberg | |
| 8,217,304 B2 | 7/2012 | Cordingley et al. | |
| 8,237,788 B2 | 8/2012 | Cooper et al. | |
| 8,243,764 B2 | 8/2012 | Tucker et al. | |
| 8,251,475 B2 | 8/2012 | Murray et al. | |
| 8,269,108 B2 | 9/2012 | Kunishi et al. | |
| 8,270,441 B2 | 9/2012 | Rogers et al. | |
| 8,270,445 B2 | 9/2012 | Morasse et al. | |
| 8,278,591 B2 | 10/2012 | Chouf et al. | |
| 8,288,679 B2 | 10/2012 | Unrath | |
| 8,288,683 B2 | 10/2012 | Jennings et al. | |
| 8,310,009 B2 | 11/2012 | Saran et al. | |
| 8,317,413 B2 | 11/2012 | Fisher et al. | |
| 8,362,391 B2 | 1/2013 | Partlo et al. | |
| 8,395,084 B2 | 3/2013 | Tanaka | |
| 8,404,998 B2 | 3/2013 | Unrath et al. | |

(56) References Cited

U.S. PATENT DOCUMENTS

| | | |
|---|---|---|
| 8,411,710 B2 | 4/2013 | Tamaoki |
| 8,414,264 B2 | 4/2013 | Bolms et al. |
| 8,415,613 B2 | 4/2013 | Heyn et al. |
| 8,433,161 B2 | 4/2013 | Langseth et al. |
| 8,442,303 B2 | 5/2013 | Cheng et al. |
| 8,472,099 B2 | 6/2013 | Fujino et al. |
| 8,509,577 B2 | 8/2013 | Liu |
| 8,526,110 B1 | 9/2013 | Honea et al. |
| 8,537,871 B2 | 9/2013 | Saracco |
| 8,542,145 B2 | 9/2013 | Galati |
| 8,542,971 B2 | 9/2013 | Chatigny |
| 8,593,725 B2 | 11/2013 | Kliner et al. |
| 8,711,471 B2 | 4/2014 | Liu et al. |
| 8,728,591 B2 | 5/2014 | Inada et al. |
| 8,755,649 B2 | 6/2014 | Yilmaz et al. |
| 8,755,660 B1 | 6/2014 | Minelly |
| 8,774,237 B2 | 7/2014 | Maryashin et al. |
| 8,781,269 B2 | 7/2014 | Huber et al. |
| 8,809,734 B2 | 8/2014 | Cordingley et al. |
| 8,835,804 B2 | 9/2014 | Farmer et al. |
| 8,861,910 B2 | 10/2014 | Yun |
| 8,873,134 B2 | 10/2014 | Price et al. |
| 8,934,742 B2 | 1/2015 | Voss et al. |
| 8,947,768 B2 | 2/2015 | Kliner et al. |
| 8,948,218 B2 | 2/2015 | Gapontsev et al. |
| 8,953,914 B2 | 2/2015 | Genier |
| 9,014,220 B2 | 4/2015 | Minelly et al. |
| 9,136,663 B2 | 9/2015 | Taya |
| 9,140,873 B2 | 9/2015 | Minelly |
| 9,158,066 B2 | 10/2015 | Fini et al. |
| 9,170,359 B2 | 10/2015 | Van Bommel et al. |
| 9,170,367 B2 | 10/2015 | Messerly et al. |
| 9,200,887 B2 | 12/2015 | Potsaid et al. |
| 9,207,395 B2 | 12/2015 | Fini et al. |
| 9,217,825 B2 | 12/2015 | Ye et al. |
| 9,250,390 B2 | 2/2016 | Muendel et al. |
| 9,310,560 B2 | 4/2016 | Chann et al. |
| 9,322,989 B2 | 4/2016 | Fini et al. |
| 9,325,151 B1 | 4/2016 | Fini et al. |
| 9,339,890 B2 | 5/2016 | Woods et al. |
| 9,366,887 B2 | 6/2016 | Tayebati et al. |
| 9,397,466 B2 | 7/2016 | McComb et al. |
| 9,431,786 B2 | 8/2016 | Savage-Leuchs |
| 9,442,252 B2 | 9/2016 | Genier |
| 9,482,821 B2 | 11/2016 | Huber et al. |
| 9,496,683 B1 | 11/2016 | Kanskar |
| 9,507,084 B2 | 12/2016 | Fini et al. |
| 9,537,042 B2 | 1/2017 | Dittli et al. |
| 9,547,121 B2 | 1/2017 | Hou et al. |
| 9,634,462 B2 | 4/2017 | Kliner et al. |
| 9,823,422 B2 | 11/2017 | Muendel et al. |
| 9,837,783 B2 * | 12/2017 | Kliner .................. H01S 3/0675 |
| 10,295,845 B2 | 5/2019 | Kliner et al. |
| 10,310,201 B2 | 6/2019 | Kliner |
| 10,423,015 B2 | 9/2019 | Kliner et al. |
| 2001/0050364 A1 | 12/2001 | Tanaka et al. |
| 2002/0097963 A1 | 7/2002 | Ukechi et al. |
| 2002/0146202 A1 | 10/2002 | Reed et al. |
| 2002/0147394 A1 | 10/2002 | Ellingsen |
| 2002/0158052 A1 | 10/2002 | Ehrmann et al. |
| 2002/0159685 A1 | 10/2002 | Cormack |
| 2002/0168139 A1 | 11/2002 | Clarkson et al. |
| 2002/0176676 A1 | 11/2002 | Johnson et al. |
| 2002/0181512 A1 | 12/2002 | Wang et al. |
| 2003/0031407 A1 | 2/2003 | Weisberg et al. |
| 2003/0032204 A1 | 2/2003 | Walt et al. |
| 2003/0043384 A1 | 3/2003 | Hill |
| 2003/0059184 A1 | 3/2003 | Tankala et al. |
| 2003/0095578 A1 | 5/2003 | Kopp et al. |
| 2003/0118305 A1 | 6/2003 | Reed et al. |
| 2003/0152342 A1 | 8/2003 | Wang et al. |
| 2003/0174387 A1 | 9/2003 | Eggleton et al. |
| 2003/0213998 A1 | 11/2003 | Hsu et al. |
| 2003/0219208 A1 | 11/2003 | Kwon et al. |
| 2004/0013379 A1 | 1/2004 | Johnson et al. |
| 2004/0031779 A1 | 2/2004 | Cahill et al. |
| 2004/0086245 A1 | 5/2004 | Farroni et al. |
| 2004/0112634 A1 | 6/2004 | Tanaka et al. |
| 2004/0126059 A1 | 7/2004 | Bhagavatula et al. |
| 2004/0207936 A1 | 10/2004 | Yamamoto et al. |
| 2004/0208464 A1 | 10/2004 | Po |
| 2005/0002607 A1 | 1/2005 | Neuhaus et al. |
| 2005/0017156 A1 | 1/2005 | Ehrmann |
| 2005/0027288 A1 | 2/2005 | Oyagi et al. |
| 2005/0041697 A1 | 2/2005 | Seifert et al. |
| 2005/0168847 A1 | 8/2005 | Sasaki |
| 2005/0185892 A1 | 8/2005 | Kwon et al. |
| 2005/0191017 A1 | 9/2005 | Croteau et al. |
| 2005/0233557 A1 | 10/2005 | Tanaka et al. |
| 2005/0259944 A1 | 11/2005 | Anderson et al. |
| 2005/0265678 A1 | 12/2005 | Manyam et al. |
| 2005/0271340 A1 | 12/2005 | Weisberg et al. |
| 2006/0024001 A1 | 2/2006 | Kobayashi |
| 2006/0054606 A1 | 3/2006 | Amako |
| 2006/0067632 A1 | 3/2006 | Broeng et al. |
| 2006/0219673 A1 | 10/2006 | Varnham et al. |
| 2006/0275705 A1 | 12/2006 | Dorogy et al. |
| 2006/0291788 A1 | 12/2006 | Po |
| 2007/0026676 A1 | 2/2007 | Li et al. |
| 2007/0041083 A1 | 2/2007 | Di Teodoro et al. |
| 2007/0047066 A1 | 3/2007 | Green |
| 2007/0047940 A1 | 3/2007 | Matsumoto |
| 2007/0075060 A1 | 4/2007 | Shedlov et al. |
| 2007/0104436 A1 | 5/2007 | Li et al. |
| 2007/0104438 A1 | 5/2007 | Varnham |
| 2007/0147751 A1 | 6/2007 | Fini |
| 2007/0178674 A1 | 8/2007 | Imai et al. |
| 2007/0195850 A1 | 8/2007 | Schluter et al. |
| 2007/0215820 A1 | 9/2007 | Cordingley et al. |
| 2007/0251543 A1 | 11/2007 | Singh |
| 2008/0037604 A1 | 2/2008 | Savage-Leuchs |
| 2008/0124022 A1 | 5/2008 | Ivtsenkov |
| 2008/0141724 A1 | 6/2008 | Fuflyigin |
| 2008/0154249 A1 | 6/2008 | Cao |
| 2008/0181567 A1 | 7/2008 | Bookbinder et al. |
| 2008/0231939 A1 | 9/2008 | Gluckstad |
| 2008/0246024 A1 | 10/2008 | Touwslager et al. |
| 2009/0034059 A1 | 2/2009 | Fini |
| 2009/0052849 A1 | 2/2009 | Lee et al. |
| 2009/0059353 A1 | 3/2009 | Fini |
| 2009/0080472 A1 | 3/2009 | Yao et al. |
| 2009/0080835 A1 | 3/2009 | Frith |
| 2009/0122377 A1 | 5/2009 | Wagner |
| 2009/0127477 A1 | 5/2009 | Tanaka et al. |
| 2009/0129237 A1 | 5/2009 | Chen et al. |
| 2009/0152247 A1 | 6/2009 | Jennings et al. |
| 2009/0154512 A1 | 6/2009 | Simons et al. |
| 2009/0175301 A1 | 7/2009 | Li et al. |
| 2009/0257621 A1 | 10/2009 | Silver |
| 2009/0274833 A1 | 11/2009 | Li |
| 2009/0297108 A1 | 12/2009 | Ushiwata et al. |
| 2009/0297140 A1 | 12/2009 | Heismann et al. |
| 2009/0314752 A1 | 12/2009 | Manens et al. |
| 2009/0324233 A1 | 12/2009 | Samartsev et al. |
| 2010/0025387 A1 | 2/2010 | Arai et al. |
| 2010/0067013 A1 | 3/2010 | Howieson et al. |
| 2010/0067555 A1 | 3/2010 | Austin et al. |
| 2010/0067860 A1 * | 3/2010 | Ikeda .................. G02B 6/03633 385/127 |
| 2010/0116794 A1 | 5/2010 | Taido et al. |
| 2010/0129029 A1 | 5/2010 | Westbrook |
| 2010/0150186 A1 | 6/2010 | Mizuuchi |
| 2010/0163537 A1 | 7/2010 | Furuta et al. |
| 2010/0187409 A1 | 7/2010 | Cristiani et al. |
| 2010/0225974 A1 | 9/2010 | Sandstrom |
| 2010/0230665 A1 | 9/2010 | Verschuren et al. |
| 2010/0251437 A1 | 9/2010 | Heyn et al. |
| 2010/0252543 A1 | 10/2010 | Manens et al. |
| 2010/0257641 A1 | 10/2010 | Perkins et al. |
| 2010/0303419 A1 | 12/2010 | Benjamin et al. |
| 2011/0032602 A1 | 2/2011 | Rothenberg |
| 2011/0058250 A1 | 3/2011 | Liu et al. |
| 2011/0080476 A1 | 4/2011 | Dinauer et al. |
| 2011/0091155 A1 | 4/2011 | Yilmaz et al. |

(56) References Cited

U.S. PATENT DOCUMENTS

| | | |
|---|---|---|
| 2011/0127697 A1 | 6/2011 | Milne |
| 2011/0133365 A1 | 6/2011 | Ushimaru et al. |
| 2011/0163077 A1 | 7/2011 | Partlo et al. |
| 2011/0187025 A1 | 8/2011 | Costin, Sr. |
| 2011/0243161 A1 | 10/2011 | Tucker et al. |
| 2011/0248005 A1 | 10/2011 | Briand et al. |
| 2011/0278277 A1 | 11/2011 | Stork Genannt Wersborg |
| 2011/0279826 A1 | 11/2011 | Miura et al. |
| 2011/0297229 A1 | 12/2011 | Gu et al. |
| 2011/0305249 A1 | 12/2011 | Gapontsev et al. |
| 2011/0305256 A1 | 12/2011 | Chann |
| 2011/0316029 A1 | 12/2011 | Maruyama et al. |
| 2012/0002919 A1 | 1/2012 | Liu |
| 2012/0051084 A1 | 3/2012 | Yalin et al. |
| 2012/0051692 A1 | 3/2012 | Seo |
| 2012/0082410 A1 | 4/2012 | Peng et al. |
| 2012/0093461 A1 | 4/2012 | Ramachandran |
| 2012/0127097 A1 | 5/2012 | Gaynor et al. |
| 2012/0127563 A1 | 5/2012 | Farmer et al. |
| 2012/0128294 A1 | 5/2012 | Voss et al. |
| 2012/0145685 A1 | 6/2012 | Ream et al. |
| 2012/0148823 A1 | 6/2012 | Chu |
| 2012/0156458 A1 | 6/2012 | Chu |
| 2012/0168411 A1 | 7/2012 | Farmer et al. |
| 2012/0219026 A1 | 8/2012 | Saracco et al. |
| 2012/0262781 A1 | 10/2012 | Price et al. |
| 2012/0267345 A1 | 10/2012 | Clark |
| 2012/0295071 A1 | 11/2012 | Sato |
| 2012/0301733 A1 | 11/2012 | Eckert et al. |
| 2012/0301737 A1 | 11/2012 | Labelle et al. |
| 2012/0321262 A1 | 12/2012 | Goell et al. |
| 2012/0329974 A1 | 12/2012 | Inada et al. |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0028276 A1 | 1/2013 | Minelly et al. |
| 2013/0038923 A1 | 2/2013 | Jespersen et al. |
| 2013/0087694 A1 | 4/2013 | Creeden et al. |
| 2013/0095260 A1 | 4/2013 | Bovatsek et al. |
| 2013/0134637 A1 | 5/2013 | Wiesner et al. |
| 2013/0146569 A1 | 6/2013 | Woods et al. |
| 2013/0148925 A1 | 6/2013 | Muendel et al. |
| 2013/0182725 A1 | 7/2013 | Karlsen et al. |
| 2013/0186871 A1 | 7/2013 | Suzuki |
| 2013/0202264 A1 | 8/2013 | Messerly et al. |
| 2013/0223792 A1 | 8/2013 | Huber et al. |
| 2013/0228442 A1 | 9/2013 | Mohaptatra et al. |
| 2013/0251324 A1 | 9/2013 | Fini et al. |
| 2013/0272657 A1 | 10/2013 | Salokatve |
| 2013/0299468 A1 | 11/2013 | Unrath et al. |
| 2013/0301300 A1 | 11/2013 | Duerksen et al. |
| 2013/0308661 A1 | 11/2013 | Nishimura et al. |
| 2013/0343703 A1 | 12/2013 | Genier |
| 2014/0044143 A1 | 2/2014 | Clarkson et al. |
| 2014/0086526 A1 | 3/2014 | Starodubov et al. |
| 2014/0104618 A1 | 4/2014 | Potsaid et al. |
| 2014/0155873 A1 | 6/2014 | Bor |
| 2014/0177038 A1 | 6/2014 | Rrataj et al. |
| 2014/0178023 A1 | 6/2014 | Oh et al. |
| 2014/0205236 A1 | 7/2014 | Noguchi et al. |
| 2014/0233900 A1 | 8/2014 | Hugonnot et al. |
| 2014/0241385 A1 | 8/2014 | Fomin et al. |
| 2014/0259589 A1 | 9/2014 | Xu et al. |
| 2014/0263209 A1 | 9/2014 | Burris et al. |
| 2014/0268310 A1 | 9/2014 | Ye et al. |
| 2014/0271328 A1 | 9/2014 | Burris et al. |
| 2014/0313513 A1 | 10/2014 | Liao |
| 2014/0319381 A1 | 10/2014 | Gross |
| 2014/0332254 A1 | 11/2014 | Pellerite et al. |
| 2014/0333931 A1 | 11/2014 | Lu et al. |
| 2014/0334788 A1 | 11/2014 | Fini et al. |
| 2015/0049987 A1 | 2/2015 | Grasso et al. |
| 2015/0096963 A1 | 4/2015 | Bruck |
| 2015/0104139 A1 | 4/2015 | Brunet et al. |
| 2015/0125114 A1 | 5/2015 | Genier |
| 2015/0125115 A1 | 5/2015 | Genier |
| 2015/0138630 A1 | 5/2015 | Honea et al. |
| 2015/0165556 A1 | 6/2015 | Jones et al. |
| 2015/0217402 A1 | 8/2015 | Hesse et al. |
| 2015/0241632 A1 | 8/2015 | Chann et al. |
| 2015/0270089 A1 | 9/2015 | Ghanea-Hercock |
| 2015/0283613 A1 | 10/2015 | Backlund et al. |
| 2015/0293300 A1 | 10/2015 | Fini et al. |
| 2015/0293306 A1 | 10/2015 | Huber et al. |
| 2015/0314612 A1 | 11/2015 | Balasini et al. |
| 2015/0316716 A1 | 11/2015 | Fini et al. |
| 2015/0325977 A1 | 11/2015 | Gu et al. |
| 2015/0331205 A1 | 11/2015 | Tayebati et al. |
| 2015/0349481 A1 | 12/2015 | Kliner |
| 2015/0352664 A1 | 12/2015 | Errico et al. |
| 2015/0372445 A1 | 12/2015 | Harter |
| 2015/0378184 A1 | 12/2015 | Tayebati et al. |
| 2016/0013607 A1 | 1/2016 | McComb et al. |
| 2016/0052162 A1 | 2/2016 | Colin et al. |
| 2016/0059354 A1 | 3/2016 | Sercel et al. |
| 2016/0097903 A1 | 4/2016 | Li et al. |
| 2016/0104995 A1 | 4/2016 | Savage-Leuchs |
| 2016/0111851 A1 | 4/2016 | Kliner et al. |
| 2016/0114431 A1 | 4/2016 | Cheverton et al. |
| 2016/0116679 A1 | 4/2016 | Muendel et al. |
| 2016/0158889 A1 | 6/2016 | Carter et al. |
| 2016/0187646 A1 | 6/2016 | Ehrmann |
| 2016/0207111 A1 | 7/2016 | Robrecht et al. |
| 2016/0218476 A1 | 7/2016 | Kliner et al. |
| 2016/0285227 A1 | 9/2016 | Farrow et al. |
| 2016/0294150 A1 | 10/2016 | Johnson |
| 2016/0320565 A1 | 11/2016 | Brown et al. |
| 2016/0320685 A1 | 11/2016 | Tayebati et al. |
| 2016/0369332 A1 | 12/2016 | Rothberg et al. |
| 2017/0003461 A1 | 1/2017 | Tayebati et al. |
| 2017/0090119 A1 | 3/2017 | Logan et al. |
| 2017/0110845 A1 | 4/2017 | Hou et al. |
| 2017/0120537 A1 | 5/2017 | DeMuth et al. |
| 2017/0162999 A1 | 6/2017 | Saracco et al. |
| 2017/0271837 A1 | 9/2017 | Hemenway et al. |
| 2017/0293084 A1 | 10/2017 | Zhou et al. |
| 2017/0336580 A1 | 11/2017 | Tayebati et al. |
| 2017/0363810 A1 | 12/2017 | Holland et al. |
| 2018/0059343 A1 | 3/2018 | Kliner et al. |
| 2018/0203185 A1 | 7/2018 | Farrow et al. |

FOREIGN PATENT DOCUMENTS

| | | |
|---|---|---|
| CN | 1584644 | 2/2005 |
| CN | 1617003 | 5/2005 |
| CN | 1217030 C | 8/2005 |
| CN | 1926460 | 3/2007 |
| CN | 1966224 | 5/2007 |
| CN | 2637535 | 8/2007 |
| CN | 101143405 | 3/2008 |
| CN | 101303269 | 11/2008 |
| CN | 101314196 | 12/2008 |
| CN | 101435918 | 5/2009 |
| CN | 101733561 | 6/2010 |
| CN | 101836309 | 9/2010 |
| CN | 102007653 | 4/2011 |
| CN | 201783759 | 4/2011 |
| CN | 102176104 | 9/2011 |
| CN | 102441740 | 5/2012 |
| CN | 102448623 | 5/2012 |
| CN | 102481664 | 5/2012 |
| CN | 101907742 B | 7/2012 |
| CN | 102549377 | 7/2012 |
| CN | 102782540 | 11/2012 |
| CN | 102844942 | 12/2012 |
| CN | 103097931 | 5/2013 |
| CN | 103173760 | 6/2013 |
| CN | 103490273 | 1/2014 |
| CN | 103521920 | 1/2014 |
| CN | 103606803 | 2/2014 |
| CN | 103999302 | 8/2014 |
| CN | 104169763 | 11/2014 |
| CN | 104999670 | 10/2015 |

(56) References Cited

FOREIGN PATENT DOCUMENTS

| | | |
|---|---|---|
| CN | 105383060 | 3/2016 |
| CN | 102582274 | 7/2019 |
| DE | 3833992 | 4/1990 |
| DE | 4200587 | 4/1993 |
| DE | 4437284 | 4/1996 |
| DE | 203 20 269 | 4/2004 |
| DE | 10321102 | 12/2004 |
| DE | 60312826 | 1/2008 |
| DE | 102009026526 | 12/2010 |
| DE | 102013215362 | 2/2015 |
| DE | 102013017792 | 4/2015 |
| DE | 202016004237 | 8/2016 |
| DE | 102015103127 | 9/2016 |
| EP | 0366856 | 5/1990 |
| EP | 0731743 B1 | 4/1998 |
| EP | 1238745 | 9/2002 |
| EP | 1681542 | 7/2006 |
| EP | 1800700 | 6/2007 |
| EP | 1974848 | 10/2008 |
| EP | 1266259 | 5/2011 |
| EP | 2587564 | 5/2013 |
| EP | 2642246 | 9/2013 |
| EP | 2886226 | 6/2015 |
| JP | H02220314 | 9/1990 |
| JP | H06-297168 | 10/1994 |
| JP | H11780 | 1/1999 |
| JP | H11-287922 | 10/1999 |
| JP | H11-344636 | 12/1999 |
| JP | 2003-129862 | 5/2003 |
| JP | 2003200286 | 7/2003 |
| JP | 2004291031 | 10/2004 |
| JP | 2005/070608 | 3/2005 |
| JP | 2006-45584 | 2/2006 |
| JP | 2006-098085 | 4/2006 |
| JP | 2006-106227 | 4/2006 |
| JP | 2008-281395 | 11/2008 |
| JP | 2009-142866 | 7/2009 |
| JP | 2009-248157 | 10/2009 |
| JP | 2012-059920 | 3/2012 |
| JP | 2012-528011 | 11/2012 |
| JP | 2016/201558 | 12/2016 |
| KR | 10-2011-0109957 | 10/2011 |
| RU | 2008742 | 2/1994 |
| RU | 2021881 | 10/1994 |
| RU | 68715 | 11/2007 |
| RU | 2365476 | 8/2009 |
| RU | 2528287 | 9/2014 |
| RU | 2015112812 | 10/2016 |
| TW | 553430 | 9/2003 |
| TW | 200633062 | 9/2006 |
| TW | I271904 | 1/2007 |
| TW | 200707466 | 2/2007 |
| TW | 201307949 | 2/2013 |
| WO | WO 1995/011100 | 4/1995 |
| WO | WO 1995/011101 | 4/1995 |
| WO | WO 2003/044914 | 5/2003 |
| WO | WO 2004/027477 | 4/2004 |
| WO | WO 2008/053915 | 5/2008 |
| WO | WO 2009/155536 | 12/2009 |
| WO | WO 2010/029243 | 3/2010 |
| WO | WO 2011/124671 | 10/2011 |
| WO | WO 2011/146407 | 11/2011 |
| WO | WO 2012/102655 | 8/2012 |
| WO | WO 2013/090236 | 6/2013 |
| WO | WO 2014/074947 | 5/2014 |
| WO | WO 2014/154901 | 10/2014 |
| WO | WO 2014/179345 | 11/2014 |
| WO | WO 2014/180870 | 11/2014 |
| WO | WO 2015/156281 | 10/2015 |
| WO | WO 2015/189883 | 12/2015 |
| WO | WO 2016/061657 | 4/2016 |
| WO | WO 2017/008022 | 1/2017 |
| WO | WO 2017/136831 | 8/2017 |

OTHER PUBLICATIONS

Adelman et al., "Measurement of Relative State-to-State Rate Constants for the Reaction D+H$_2$(v, j) → HD(v', j')+H," *J. Chem. Phys.*, 97:7323-7341 (Nov. 15, 1992).

Advisory Action from U.S. Appl. No. 15/607,410, dated Sep. 24, 2018, 6 pages.

Argyros et al., "Bend loss in highly multimode fibres," *Optics Express*, 16:18590-18598 (Nov. 10, 2008).

Alcock et al., Element Table, *Canadian Metallurgical Quarterly*, 23:309-311 (1984).

Affine Transformation—from Wolfram MathWorld, http://mathworld.wolfram.com/AffineTransformation.html, downloaded Feb. 21, 2014, 2 pages.

Alfano et al., "Photodissociation and Recombination Dynamics of I$_2$- in Solution," *Ultrafast Phenomena VIII*, (Springer-Verlag, New York), pp. 653-655 (Jan. 1993).

AlMangour et al., "Scanning strategies for texture and anisotropy tailoring during selective laser melting of TiC/316L stainless steel nanocomposites," *Journal of Alloys and Compounds*, 728:424-435 (Aug. 5, 2017).

Anastasiadi et al., "Fabrication and characterization of machined multi-core fiber tweezers for single cell manipulation," *Optics Express*, 26:3557-3567 (Feb. 5, 2018).

Andreasch et al., "Two concentric fiber diameters in one laser light cable," *Optical Components*, No. 1, pp. 38-41 (Jan. 2011).

"ARM," Coherent, available at: http://www.corelase.fi/products/arm/, 6 pages, retrieved May 26, 2017.

Ayoola, "Study of Fundamental Laser Material Interaction Parameters in Solid and Powder Melting," Ph.D. Thesis, Cranfield University, 192 pages (May 2016).

Bai et al., "Effect of Bimodal Powder Mixture on Powder Packing Density and Sintered Density in Binder Jetting of Metals," 26th Annual International Solid Freeform Fabrication Symposium, 14 pages (Aug. 10-12, 2015).

Balazic, "Additive Manufacturing and 3D Printing LENS Technology," Additive Manufacturing of Metal Components Conference at IK4-Lortek, 52 pages (Nov. 27, 2013).

Barron et al., "Dual-beam interference from a lensed multicore fiber and its application to optical trapping," *Optics Express*, 20:23156-23161 (Oct. 8, 2012).

Barron et al., "Optical Trapping using a Lensed Multicore Fiber," Workshop on Specialty Optical Fibers and their Applications, OSA 2013, 2 pages (2013).

"Bending Machine," CBC Alta Technologia Italiana, General Catalog, pp. 96-97 (2011).

Bergmann et al., "Effects of diode laser superposition on pulsed laser welding of aluminum," *Physics Procedia*, 41:180-189 (2013).

Bernasconi et al., "Kinetics of Ionization of Nitromethane and Phenylnitromethane by Amines and Carboxylate Ions in Me$_2$SO-Water Mixtures. Evidence of Ammonium Ion-Nitronate Ion Hydrogen Bonded Complex Formation in Me$_2$SO-Rich Solvent Mixtures," *J. Org. Chem.*, 53:3342-3351 (Jul. 1988).

Bernasconi et al., "The Effect of Solvation on Intrinsic Rates of Proton Transfer," *Physical Organic Chemistry 1986*, (Elsevier, Amsterdam), p. 583 (1987).

Bertoli et al., "On the limitations of Volumetric Energy Density as a design parameter for Selective Laser Melting," *Materials and Design*, 113:331-340 (Oct. 19, 2016).

Birks et al., "The photonic lantern," *Advances in Optics and Photonics*, 7:107-167 (2015).

Blake et al., "The H+D$_2$ Reaction: HD(v=1, J) and HD(v=2, J) Distributions at a Collision Energy of 1.3 eV," *Chem. Phys. Lett.*, 153:365-370 (Dec. 23, 1988).

Brown et al., "Fundamentals of Laser-Material Interaction and Application to Multiscale Surface Modification," Chapter 4, *Laser Precision Microfabrication*, pp. 91-120 (2010).

Burger et al., "Implementation of a spatial light modulator for intracavity beam shaping," *J. Opt.*, 17:1-7, (2015).

"Business Unit Laser Ablation and Cutting: Laser Beam Fusion Cutting with Dynamic Beam Shaping," Fraunhofer IWS Annual Report 2015, pp. 86-87 (2015).

(56) References Cited

OTHER PUBLICATIONS

"Canunda, Application Note," CAILabs, available at: www.cailabs.com, 16 pages (Jun. 10, 2015).
"Canunda, Application Note: Flexible high-power laser beam shaping," CAILabs, available at: www.cailabs.com, 22 pages, date unknown.
Caprio, "Investigation of emission modes in the SLM of AISI 316L: modelling and process diagnosis," Ph.D. Thesis, Polytechnic University of Milan, 3 pages (Apr. 28, 2017).—Abstract only.
Chen et al., "An Algorithm for Correction of Distortion of Laser Marking Systems," IEEE International Conference on Control and Automation, Guangzhou, China, 5 pages (May 30-Jun. 1, 2007).
Chen et al., "Improving additive manufacturing processability of hard-to-process overhanging structure by selective laser melting," *Journal of Materials Processing Tech.*, 250:99-108 (Jul. 1, 2017).
Chung, "Solution-Processed Flexible Transparent Conductors Composed of Silver Nanowire Networks Embedded in Indium Tin Oxide Nanoparticle Matrices," Nano Research, 10 pages (Sep. 24, 2012).
Cloots et al., "Investigations on the microstructure and crack formation of IN738LC samples processed by selective laser melting using Gaussian and doughnut profiles," *Materials and Design*, 89:770-784 (2016).
Cui, et al., "Calibration of a laser galvanometric scanning system by adapting a camera model," Applied Optics 48(14):2632-2637 (Jun. 2009).
Daniel et al., "Novel technique for mode selection in a large-mode-area fiber laser," Conference on Lasers and Electro-Optics 2010, OSA Technical Digest (CD) (Optical Society of America), paper CWC5, 2 pages (Jan. 2010).
Daniel et al., "Novel technique for mode selection in a multimode fiber laser," *Optics Express*, 19:12434-12439 (Jun. 20, 2011).
DebRoy et al., "Additive manufacturing of metallic components—Process, structure and properties," *Progress in Materials Science*, 92:112-224 (2018).
Decombe et al., "Single and dual fiber nano-tip optical tweezers: trapping and analysis," Optics Express, 21:30521-30531 (Dec. 4, 2013).
Dehoff et al., "Site specific control of crystallographic grain orientation through electron beam additive manufacturing," *Materials Science and Technology*, 31:931-938 (2015).
Demir et al., "From pulsed to continuous wave emission in SLM with contemporary fiber laser sources: effect of temporal and spatial pulse overlap in part quality," *Int. J. Adv. Manuf. Technol.*, 91:2701-2714 (Jan. 10, 2017).
Deng et al., "Annular arrayed-waveguide fiber for autofocusing Airy-like beams," *Optics Letters*, 41:824-827 (Feb. 15, 2016).
Dezfoli et al., "Determination and controlling of grain structure of metals after laser incidence: Theoretical approach," *Scientific Reports*, 7:1-11 (Jan. 30, 2017).
Di Teodoro et al., "Diffraction-Limited, 300-kW Peak-Power Pulses from a Coiled Multimode Fiber Amplifier," *Optics Letters*, 27:518-520 (May 2002).
Di Teodoro et al., "Diffraction-limited, 300-kW-peak-power Pulses from a Yb-doped Fiber Amplifier," *Conference on Lasers and Electro-Optics*, OSA Technical Digest (Optical Society of America, Washington, DC), p. 592-593 (May 22-24, 2002).
Di Teodoro et al., "High-peak-power pulsed fiber sources," *Proc. of SPIE*, 5448:561-571 (Sep. 20, 2004).
Dorrington et al., "A simple microcontroller based digital lock-in amplifier for the detection of low level optical signals," Proceedings of the First IEEE International Workshop on Electronic Design, Test and Applications (DELTA '02), 3 pages (2002).
Drobczynski et al., "Real-time force measurement in double wavelength optical tweezers," *Journal of the Optical Society of America B*, 34:38-43 (Jan. 2017).
Duflou et al., "Development of a Real Time Monitoring and Adaptive Control System for Laser Flame Cutting," *ICALEO 2009*, 527, 10 pages published online Sep. 27, 2018.
Duocastella et al., "Bessel and annular beams for materials processing," *Laser Photonics Rev.* 6, pp. 607-621 (2012).

"Efficient and Simple Precision, Laser Processing Head PDT-B," HIGHYAG, 6 pages, (Jan. 2010).
Eichenholz, "Photonic-crystal fibers have many uses," Optoelectronics World, 4 pages (Aug. 2004).
"Enhanced LENS Thermal Imaging Capabilities Introduced by Optomec," Optomec, 4 pages (Jan. 8, 2013).
"ENSIS Series," Amada America, Inc., available at: http://www.amada.com/america/ensis-3015-aj, 2 pages, retrieved May 26, 2017.
European Search Report for related Application No. 18173438.5, 3 pages, dated Oct. 5, 2018.
"EX-F Series," MC Machinery Systems, Inc., available at: https://www.mcmachinery.com/products-and-solutions/ex-f-series/, 2 pages, retrieved May 26, 2017.
Examination Report for related European Application No. 18173438.5, 8 pages, dated Jul. 17, 2019.
Extended European Search Report for related Application No. 18173438.5, 11 pages, dated Oct. 15, 2018.
Extended European Search Report for related Application No. 16849882.2, 8 pages, dated Apr. 23, 2019.
Faidel et al., "Improvement of selective laser melting by beam shaping and minimized thermally induced effects in optical systems," 9th International Conference on Photonic Technologies LANE 2016, pp. 1-4 (2016).
Farley et al., "Optical fiber designs for beam shaping," *Proc. of SPIE, Fiber Lasers XI: Technology, Systems, and Applications*, 8961:89612U-1-89612U-10 (2014).
Farrow et al., "Bend-Loss Filtered, Large-Mode-Area Fiber Amplifiers: Experiments and Modeling," Proceedings of the Solid State and Diode Laser Technology Review (Directed Energy Professional Society), P-9, 5 pages (2006).
Farrow et al., "Compact Fiber Lasers for Efficient High-Power Generation," *Proc. of SPIE*, 6287:62870C-1-62870C-6 (Sep. 1, 2006).
Farrow et al., "Design of Refractive-Index and Rare-Earth-Dopant Distributions for Large-Mode-Area Fibers Used in Coiled High-Power Amplifiers," *Proc. of SPIE*, 6453:64531C-1-64531C-11 (Feb. 22, 2007).
Farrow et al., "High-Peak-Power (>1.2 MW) Pulsed Fiber Amplifier," *Proc. of the SPIE*, 6102:61020L-1-61020L-11 (Mar. 2006).
Farrow et al., "Numerical Modeling of Self-Focusing Beams in Fiber Amplifiers," *Proc. of the SPIE*, 6453:645309-1-645309-9 (2007).
Farrow et al., "Peak-Power Limits on Fiber Amplifiers Imposed by Self-Focusing," *Optics Lett.*, 31:3423-3425 (Dec. 1, 2006).
Fermann, "Single-mode excitation of multimode fibers with ultrashort pulses," *Optics Letters*, 23:52-54 (Jan. 1, 1998).
Fève et al., "Four-wave mixing in nanosecond pulsed fiber amplifiers," *Optics Express*, 15:4647-4662 (Apr. 16, 2007).
Fève et al., "Limiting Effects of Four-Wave Mixing in High-Power Pulsed Fiber Amplifiers," *Proc. of the SPIE*, 6453:64531P-1-64531P-11 (Feb. 22, 2007).
Fey, "3D Printing and International Security," PRIF Report No. 144, 47 pages (2017).
Fini, "Bend-compensated design of large-mode-area fibers," *Optics Letters*, 31:1963-1965 (Jul. 1, 2006).
Fini, "Bend distortion in large-mode-area amplifier fiber design," *Proc. of SPIE*, 6781:67810E-1-67810E-11 (Nov. 21, 2007).
Fini, "Large mode area fibers with asymmetric bend compensation," *Optics Express*, 19:21866-21873 (Oct. 24, 2011).
Fini et al., "Bend-compensated large-mode-area fibers: achieving robust single-modedness with transformation optics," *Optics Express*, 21:19173-19179 (Aug. 12, 2013).
Florentin et al., "Shaping the light amplified in a multimode fiber," *Official Journal of the CIOMP, Light: Science & Applications*, 6:1-9 (Feb. 24, 2017).
Fox et al., "Effect of low-earth orbit space on radiation-induced absorption in rare-earth-doped optical fibers," *J. Non-Cryst. Solids*, 378:79-88 (Oct. 15, 2013).
Fox et al., "Gamma Radiation Effects in Yb-Doped Optical Fiber," *Proc. of the SPIE*, 6453:645328-1-645328-9 (Feb. 23, 2007).
Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).

(56) References Cited

OTHER PUBLICATIONS

Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).
Fox et al., "Radiation damage effects in doped fiber materials," *Proc. of the SPIE*, 6873:68731F-1-68731F-9 (Feb. 22, 2008).
Fox et al., "Spectrally Resolved Transmission Loss in Gamma Irradiated Yb-Doped Optical Fibers," *IEEE J. Quant. Electron.*, 44:581-586 (Jun. 2008).
Fox et al., "Temperature and Dose-Rate Effects in Gamma Irradiated Rare-Earth Doped Fibers," *Proc. of SPIE*, 7095:70950B-1-70950B-8 (Aug. 26, 2008).
Francis, "The Effects of Laser and Electron Beam Spot Size in Additive Manufacturing Processes," Ph.D. Thesis, Carnegie Mellon University, 191 pages (May 2017).
Fuchs et al., "Beam shaping concepts with aspheric surfaces," *Proc. of SPIE*, 9581:95810L-1-95810L-7 (Aug. 25, 2015).
Fuse, "Beam Shaping for Advanced Laser Materials Processing," *Laser Technik Journal*, pp. 19-22 (Feb. 2015).
Garcia et al., "Fast adaptive laser shaping based on multiple laser incoherent combining," *Proc. of SPIE*, 10097:1009705-1-1009705-15 (Feb. 22, 2017).
Gardner, "Precision Photolithography on Flexible Substrates," http://azorescorp.com/downloads/Articles/AZORESFlexSubstrate.pdf (prior to Jan. 30, 2013).
Ghasemi et al., "Beam shaping design for coupling high power diode laser stack to fiber," *Applied Optics*, 50:2927-2930 (Jun. 20, 2011).
Ghatak et al., "Design of Waveguide Refractive Index Profile to Obtain Flat Model Field," SPIE, 3666:40-44 (Apr. 1999).
Ghouse et al., "The influence of laser parameters and scanning strategies on the mechanical properties of a stochastic porous material," *Materials and Design*, 131:498-508 (2017).
Giannini et al., "Anticipating, measuring, and minimizing MEMS mirror scan error to improve laser scanning microscopy's speed and accuracy," *PLOS ONE*, 14 pages (Oct. 3, 2017).
Gissibl et al., "Sub-micrometre accurate free-form optics by three-dimensional printing on single-mode fibres," *Nature Communications*, 7:1-9 (Jun. 24, 2016).
Gockel et al., "Integrated melt pool and microstructure control for Ti—6Al—4V thin wall additive manufacturing," *Materials Science and Technology*, 31:912-916 (Nov. 3, 2014).
Goers et al., "Development of a Compact Gas Imaging Sensor Employing cw Fiber-Amp-Pumped PPLN OPO," *Conference on Lasers and Electro-Optics*, OSA Technical Digest (Optical Society of America, Washington, DC), p. 521 (May 11, 2001).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).
Goldberg et al., "Deep UV Generation by Frequency Quadrupling of a High-Power GaAlAs Semiconductor Laser," *Optics Lett.*, 20:1145-1147 (May 15, 1995).
Goldberg et al., "High Efficiency 3 W Side-Pumped Yb Fiber Amplifier and Laser," *Conference on Lasers and Electro-Optics*, OSA Technical Digest (Optical Society of America, Washington, DC), p. 11-12 (May 24, 1999).
Goldberg et al., "Highly Efficient 4-W Yb-Doped Fiber Amplifier Pumped by a Broad-Stripe Laser Diode," *Optics Lett.*, 24:673-675 (May 15, 1999).
Goldberg et al., "High-Power Superfluorescent Source with a Side-Pumped Yb-Doped Double-Cladding Fiber," *Optics Letters*, 23:1037-1039 (Jul. 1, 1998).
Goldberg et al., "Tunable UV Generation at 286 nm by Frequency Tripling of a High-Power Modelocked Semiconductor Laser," *Optics Lett.*, 20:1640-1642 (Aug. 1, 1995).
Golub, "Laser Beam Splitting by Diffractive Optics," *Optics and Photonics News*, 6 pages (Feb. 2004).
Goppold et al., "Dynamic Beam Shaping Improves Laser Cutting of Thick Steel Plates," *Industrial Photonics*, 4:18-19 (Jul. 2017).

Grigoriyants et al., "Tekhnologicheskie protsessy lazernoy obrabotki," Moscow, izdatelstvo MGTU im. N.E. Baumana, p. 334 (2006).
Gris-Sanchez et al., "The Airy fiber: an optical fiber that guides light diffracted by a circular aperture," *Optica*, 3:270-276 (Mar. 2016).
Gunenthiram et al., "Analysis of laser-melt pool-powder bed interaction during the selective laser melting of a stainless steel," *Journal of Laser Applications*, 29:022303-1-022303-8 (May 2017).
Gupta, "A Review on Layer Formation Studies in Selective Laser Melting of Steel Powders and Thin Wall Parts Using Pulse Shaping," *International Journal of Manufacturing and Material Processing*, 3:9-15 (2017).
Hafner et al., "Tailored laser beam shaping for efficient and accurate microstructuring," *Applied Physics A*, 124:111-1-111-9 (Jan. 10, 2018).
Han et al., "Reshaping collimated laser beams with Gaussian profile to uniform profiles," *Applied Optics*, 22:3644-3647 (Nov. 15, 1983).
Han et al., "Selective laser melting of advanced $Al—Al_2O_3$, nanocomposites: Simulation, microstructure and mechanical properties," *Materials Science & Engineering A*, 698:162-173, (May 17, 2017).
Hansen et al., "Beam shaping to control of weldpool size in width and depth," *Physics Procedia*, 56:467-476 (2014).
Hauschild, "Application Specific Beam Profiles—New Surface and Thin-Film Refinement Processes using Beam Shaping Technologies," *Proc. of SPIE*, 10085:100850J-1-100850J-9 (Feb. 22, 2017).
Headrick et al., "Application of laser photofragmentation-resonance enhanced multiphoton ionization to ion mobility spectrometry," *Applied Optics*, 49:2204-2214 (Apr. 10, 2010).
Hebert, "Viewpoint: metallurgical aspects of powder bed metal additive manufacturing," *J. Mater. Sci.*, 51:1165-1175 (Nov. 18, 2015).
Heck, "Highly integrated optical phased arrays: photonic integrated circuits for optical beam shaping and beam steering," *Nanophotonics*, 6:93-107 (2017).
Heider et al., "Process Stabilization at welding Copper by Laser Power Modulation," *Physics Procedia*, 12:81-87 (2011).
Hemenway et al., "Advances in high-brightness fiber-coupled laser modules for pumping multi-kW CW fiber lasers," *Proceedings of SPIE*, 10086:1008605-1-1008605-7 (Feb. 22, 2017).
Hemenway et al., "High-brightness, fiber-coupled pump modules in fiber laser applications," *Proc. of SPIE*, 8961:89611V-1-89611V-12 (Mar. 7, 2014).
Hengesbach et al., "Brightness and average power as driver for advancements in diode lasers and their applications," *Proc. SPIE*, 9348, 18 pages (2015).
Hester et al., "Tunable optical tweezers for wavelength-dependent measurements," *Review of Scientific Instruments*, 83:043114-1-043114-8 (2012).
Hoops et al., "Detection of mercuric chloride by photofragment emission using a frequency-converted fiber amplifier," *Applied Optics*, 46:4008-4014 (Jul. 1, 2007).
Hotoleanu et al., "High Order Modes Suppression in Large Mode Area Active Fibers by Controlling the Radial Distribution of the Rare Earth Dopant," *Proc. of the SPIE*, 6102:61021T-1-610211-8 (Feb. 23, 2006).
"How to Select a Beamsplitter," IDEX—Optics & Photonics Marketplace, available at: https://www.cvilaseroptics.com/file/general/beamSplitters.pdf, 5 pages (Jan. 8, 2014).
Huang et al., "3D printing optical engine for controlling material microstructure," *Physics Procedia*, 83:847-853 (2016).
Huang et al., "All-fiber mode-group-selective photonic lantern using graded-index multimode fibers," *Optics Express*, 23:224-234 (Jan. 6, 2015).
Huang et al., "Double-cutting beam shaping technique for high-power diode laser area light source," *Optical Engineering*, 52:106108-1-106108-6 (Oct. 2013).
Herwig, et al. "Possibilities of Power Modulation and Dynamic Beam Shaping", Fraunhofer IWS presentation, retrieved on Mar. 16, 2018, 6 pages.
Injeyan et al., "Introduction to Optical Fiber Lasers," *High-Power Laser Handbook*, pp. 436-439 (2011).
International Preliminary Report on Patentability from International Application No. PCT/US2017/034848, dated Apr. 2, 2019, 9 pages.

(56) References Cited

OTHER PUBLICATIONS

International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for related International Application No. PCT/US2016/041526, 6 pages, dated Oct. 20, 2016.
International Search Report and Written Opinion for related International Application No. PCT/US2016/053807, 6 pages, dated Jan. 19, 2017.
International Search Report and Written Opinion for International Application No. PCT/US2016/063086, 6 pages, dated Mar. 23, 2017.
International Search Report and Written Opinion for International Application No. PCT/US2017/014182, 9 pages, dated Mar. 31, 2017.
International Search Report and Written Opinion from International Application No. PCT/US2017/034848, dated Nov. 28, 2017, 15 pages.
International Search Report and Written Opinion from International Application No. PCT/US2018/015768, dated Jun. 11, 2018, 15 pages.
International Search Report and Written Opinion from International Application No. PCT/US2018/016305, dated Jun. 11, 2018, 10 pages.
International Search Report and Written Opinion from International Application No. PCT/US2018/016288, dated Jun. 11, 2018, 10 pages.
International Search Report and Written Opinion from International Application No. PCT/US2018/024145, dated Jun. 21, 2018, 5 pages.
International Search Report and Written Opinion from International Application No. PCT/US2018/015710, dated Jun. 25, 2018, 17 pages.
International Search Report and Written Opinion from International Application No. PCT/US2018/024548, dated Jun. 28, 2018, 6 pages.
International Search Report and Written Opinion from International Application No. PCT/US2018/024959, dated Jun. 28, 2018, 7 pages.
International Search Report and Written Opinion for International Application No. PCT/US2018/015895, dated Jul. 10, 2018, 10 pages.
International Search Report and Written Opinion from International Application No. PCT/US2018/024510, dated Jul. 12, 2018, 6 pages.
International Search Report and Written Opinion from International Application No. PCT/US2018/024641, dated Jul. 12, 2018, 6 pages.
International Search Report and Written Opinion for International Application No. PCT/US2018/024944, dated Jul. 12, 2018, 8 pages.
International Search Report and Written Opinion from International Application No. PCT/US2018/024974, dated Jul. 12, 2018, 6 pages.
International Search Report and Written Opinion from International Application No. PCT/US2018/024908, dated Jul. 19, 2018, 8 pages.
International Search Report and Written Opinion from International Application No. PCT/US2018/022629, dated Jul. 26, 2018, 11 pages.
International Search Report and Written Opinion from International Application No. PCT/US2018/024889, dated Jul. 26, 2018, 5 pages.
International Search Report and Written Opinion for International Application No. PCT/US2018/023944, dated Aug. 2, 2018, 7 pages.
International Search Report and Written Opinion for International Application No. PCT/US2018/026110, 12 pages, dated Aug. 8, 2018.
International Search Report and Written Opinion from International Application No. PCT/US2018/023009, dated Aug. 9, 2018, 8 pages.
International Search Report and Written Opinion from International Application No. PCT/US2018/023012, dated Aug. 9, 2018, 7 pages.
International Search Report and Written Opinion for International Application No. PCT/US2018/023963, dated Aug. 9, 2018, 7 pages.
International Search Report and Written Opinion for International Application No. PCT/US2018/024899, dated Aug. 9, 2018, 7 pages.
International Search Report and Written Opinion for International Application No. PCT/US2018/024955, dated Aug. 9, 2018, 8 pages.
International Search Report and Written Opinion for International Application No. PCT/US2018/024976, dated Aug. 9, 2018, 8 pages.
International Search Report and Written Opinion for International Application No. PCT/US2018/024953, dated Aug. 16, 2018, 8 pages.
International Search Report and Written Opinion from International Application No. PCT/US2018/024954, dated Aug. 23, 2018, 7 pages.
International Search Report and Written Opinion from International Application No. PCT/US2018/024958, dated Aug. 23, 2018, 6 pages.
International Search Report and Written Opinion from International Application No. PCT/US2018/024227, dated Aug. 30, 2018, 7 pages.
International Search Report and Written Opinion from International Application No. PCT/US2018/024904, dated Aug. 30, 2018, 5 pages.
International Search Report and Written Opinion from International Application No. PCT/US2018/024971, dated Aug. 30, 2018, 8 pages.
International Search Report and Written Opinion from International Application No. PCT/US2018/024907, dated Sep. 27, 2018, 6 pages.
Ishiguro et al., "High Efficiency 4-kW Fiber Laser Cutting Machine," *Rev. Laser Eng.*, 39:680-684 (May 21, 2011).
Ivanov et al., "Fiber-Optic Bend Sensor Based on Double Cladding Fiber," *Journal of Sensors*, 2015, 6 pages (2015).
Ivanov et al., "Fiber structure based on a depressed inner cladding fiber for bend, refractive index and temperature sensing," *Meas. Sci. Technol.*, 25:1-8 (2014).
Jacobs, "Suggested Guidelines for the Handling of Optical Fiber," White Paper, Corning Incorporated, pp. 1-8 (Dec. 2001).
Jain et al., "Multi-element fiber technology for space-division multiplexing applications," *Optics Express*, 22:3787-3796 (Feb. 11, 2014).
Java—Transform a triangle to another triangle—Stack Overflow, http://stackoverflow.com/questions/1114257/transform-a-triangle-to-another-triangle?lq=1, downloaded Feb. 21, 2014, 3 pages.
Ji et al., "Meta-q-plate for complex beam shaping," *Scientific Reports*, 6:1-7 (May 6, 2016).
Jin et al., "Mode Coupling Effects in Ring-Core Fibers for Space-Division Multiplexing Systems," *Journal of Lightwave Technology*, 34:3365-3372 (Jul. 15, 2016).
Johnson et al., "Experimental and Theoretical Study of Inhomogeneous Electron Transfer in Betaine: Comparisons of Measured and Predicted Spectral Dynamics," *Chem. Phys.*, 176:555-574 (Oct. 15, 1993).
Johnson et al., "Ultrafast Experiments on the Role of Vibrational Modes in Electron Transfer," *Pure and Applied Chem.*, 64:1219-1224 (May 1992).
Jollivet, "Specialty Fiber Lasers and Novel Fiber Devices," Doctoral Dissertation, University of Central Florida, 213 pages (2014).
Jollivet et al., "Advances in Multi-Core Fiber Lasers," *Latin America Optics and Photonics Conference*, OSA Technical, 4 pages (Nov. 2014).
Kaden et al., "Selective laser melting of copper using ultrashort laser pulses," Lasers in Manufacturing Conference 2017, pp. 1-5 (2017).
Kaden et al., "Selective laser melting of copper using ultrashort laser pulses," *Applied Physics A*, 123:596-1-596-6 (Aug. 24, 2017).
Keicher et al., "Advanced 3D Printing of Metals and Electronics using Computational Fluid Dynamics," Solid Freeform Fabrication Symposium, 32 pages (Aug. 2015).
Khairallah et al, "Laser power-bed fusion additive manufacturing: Effects of main physical processes on dynamical melt flow and pore (56) References Cited

OTHER PUBLICATIONS formation from mesoscopic powder simulation," Lawrence Livermore National Laboratory, 26 pages (Aug. 20, 2015).
Khijwania et al., "Propagation characteristics of single-mode graded-index elliptical core linear and nonlinear fiber using super-Gaussian approximation," *Applied Optics*, 48:G156-G162 (Nov. 1, 2009).
King et al., "Observation of keyhole-mode laser melting in laser powder-bed fusion additive manufacturing," *Journal of Materials Processing Technology*, 214:2915-2925 (2014).
Klerks et al., "Flexible beam shaping system for the next generation of process development in laser micromachining," 9th International Conference on Photonic Technologies LANE 2016, pp. 1-8 (2016).
Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (Jun. 21-25, 2015).
Kliner et al., "4-kW fiber laser for metal cutting and welding," *Proc. of SPIE*, 7914:791418-791418-8 (Feb. 22, 2011).
Kliner et al., "Comparison of Experimental and Theoretical Absolute Rates for Intervalence Electron Transfer," *J. Am. Chem. Soc.*, 114:8323-8325 (Oct. 7, 1992).
Kliner et al., "Comparison of Experimental and Theoretical Integral Cross Sections for D+H$_2$(v=1, j=1) → HD(v'=1, j') + H," *J. Chem. Phys.*, 95:1648-1662 (Aug. 1, 1991).
Kliner et al., "D+H$_2$(v=1, J=1): Rovibronic State to Rovibronic State Reaction Dynamics," *J. Chem. Phys.*, 92:2107-2109 (Feb. 1, 1990).
Kliner et al., "Effect of Indistinguishable Nuclei on Product Rotational Distributions: H+HI → H$_2$+I reaction[a]," *J. Chem. Phys.*, 90:4625-4327 (Apr. 15, 1989).
Kliner et al., "Efficient second, third, fourth, and fifth harmonic generation of a Yb-doped fiber amplifier," *Optics Communications*, 210:393-398 (Sep. 15, 2002).
Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (May 19-22, 2002).
Kliner et al., "Efficient visible and UV generation by frequency conversion of a mode-filtered fiber amplifier," *Proc. of SPIE*, 4974:230-235 (Jul. 3, 2003).
Kliner et al., "Fiber laser allows processing of highly reflective materials," *Industrial Laser Solutions*, 31:1-9 (Mar. 16, 2016).
Kliner et al., "High-Power Fiber Lasers," *Photonics & Imaging Technology*, pp. 2-5 (Mar. 2017).
Kliner et al., "Laboratory Investigation of the Catalytic Reduction Technique for Detection of Atmospheric NO$_y$," *J. Geophys. Res.*, 102:10759-10776 (May 20, 1997).
Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).
Kliner et al., "Measurements of Ground-State OH Rotational Energy-Transfer Rates," *J. Chem. Phys.*, 110:412-422 (Jan. 1, 1999).
Kliner et al., "Mode-Filtered Fiber Amplifier," Sandia National Laboratories—Brochure, 44 pages (Sep. 13, 2007).
Kliner et al., "Narrow-Band, Tunable, Semiconductor-Laser-Based Source for Deep-UV Absorption Spectroscopy," *Optics Lett.*, 22:1418-1420 (Sep. 15, 1997).
Kliner et al., "Overview of Sandia's fiber laser program," *Proceedings of SPIE—The International Society for Optical Engineering*, 6952:695202-1-695202-12 (Apr. 14, 2008).
Kliner et al., "Photodissociation and Vibrational Relaxation of I$_2^-$ in Ethanol," *J. Chem. Phys.*, 98:5375-5389 (Apr. 1, 1993).
Kliner et al., "Photodissociation Dynamics of I$_2^-$ in Solution," *Ultrafast Reaction Dynamics and Solvent Effects*, (American Institute of Physics, New York), pp. 16-35 (Feb. 1994).
Kliner et al., "Polarization-Maintaining Amplifier Employing Double-Clad, Bow-Tie Fiber," *Optics Lett.*, 26:184-186 (Feb. 15, 2001).
Kliner et al., "Power Scaling of Diffraction-Limited Fiber Sources," *Proc. of SPIE*, 5647:550-556 (Feb. 21, 2005).
Kliner et al., "Power Scaling of Rare-Earth-Doped Fiber Sources," *Proc. of SPIE*, 5653:257-261 (Jan. 12, 2005).
Kliner et al., "Product Internal-State Distribution for the Reaction H+HI → H$_2$+I," *J. Chem. Phys.*, 95:1663-1670 (Aug. 1, 1991).
Kliner et al., "The D+H$_2$ Reaction: Comparison of Experiment with Quantum-Mechanical and Quasiclassical Calculations," *Chem. Phys. Lett.*, 166:107-111 (Feb. 16, 1990).
Kliner et al., "The H+para-H$_2$ reaction: Influence of dynamical resonances on H$_2$(v'=1, j'=1 and 3) Integral Cross Sections," *J. Chem. Phys.*, 94:1069-1080 (Jan. 15, 1991).
Koplow et al., A New Method for Side Pumping of Double-Clad Fiber Sources, *J. Quantum Electronics*, 39:529-540 (Apr. 4, 2003).
Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," Proceedings of the Solid State and Diode Laser Technology Review (Directed Energy Professional Society) (Apr. 22, 2005).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (Mar. 7-10, 2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," *Optics Letters*, 25:442-444 (Apr. 1, 2000).
Koplow et al., Use of Bend Loss to Obtain Single-Transverse-Mode Operation of a Multimode Fiber Amplifier, *Conference on Lasers and Electro-Optics*, OSA Technical Digest (Optical Society of America, Washington, DC), p. 286-287 (May 7-12, 2000).
Koplow et al., "UV Generation by Frequency Quadrupling of a Yb-Doped Fiber Amplifier," *IEEE Photonics Technol. Lett.*, 10:75-77 (Jan. 1998).
Koponen et al., "Photodarkening Measurements in Large-Mode-Area Fibers," *Proc. of SPIE*, 6453:64531E-1-64531E-12 (Feb. 2007).
Kosolapov et al., "Hollow-core revolver fibre with a double-capillary reflective cladding," *Quantum Electronics*, 46:267-270 (2016).
Kotlyar et al., "Asymmetric Bessel-Gauss beams," *J. Opt. Soc. Am. A*, 31:1977-1983 (Sep. 2014).
Krupa et al., "Spatial beam self-cleaning in multimode fiber," available at: https://arxiv.org/abs/1603.02972v1, 8 pages (Mar. 9, 2016).
Kruth et al., "On-line monitoring and process control in selective laser melting and laser cutting," *Proceedings of the 5th Lane Conference, laser Assisted Net Shape Engineering*, vol. 1, 14 pages, (Sep. 1, 2007).
Kulp et al., "The application of quasi-phase-matched parametric light sources to practical infrared chemical sensing systems," *Appl. Phys. B*, 75:317-327 (Jun. 6, 2002).
Kummer et al., "Method to quantify accuracy of position feedback signals of a three-dimensional two-photon laser-scanning microscope," *Biomedical Optics Express*, 6(10):3678-3693 (Sep. 1, 2015).
"Laser cutting machines," TRUMPF, available at: http://www.us.trumpf.com/en/products/machine-tools/products/2d-laser-cutting/innovative-technology/brightline.html, 9 pages, retrieved May 26, 2017.
"Lasers & Fibers," NKT Photonics, available at: https://www.nktphotonics.com/lasers-fibers/technology/photonic-crystal-fibers/, 4 pages, retrieved Feb. 13, 2018.
Laskin et al., "Applying of refractive spatial beam shapers with scanning optics," ICALEO, Paper M604, pp. 941-947 (2011).

(56) References Cited

OTHER PUBLICATIONS

Laskin et al., "Beam shaping to generate uniform "Laser Light Sheet" and Linear Laser Spots," *Proc. of SPIE, The International Society for Optical Engineering*, 13 pages (Sep. 2013).
Lee et al., "FEM Simulations to Study the Effects of Laser Power and Scan Speed on Molten Pool Size in Additive Manufacturing," *International Journal of Mechanical and Mechatronics Engineering*, 11:1291-1295 (2017).
Lee et al., "Use of the Coaxial-Core Profile in the Erbium-Doped Fiber Amplifier for Self-Regulation of Gain Spectrum," *IEICE Trans. Commun.*, E82-B:1273-1282 (Aug. 1999).
Li et al., "High-quality near-field beam achieved in a high-power laser based on SLM adaptive beam-shaping system," *Optics Express*, 23:681-689 (Jan. 12, 2015).
Li et al., "Melt-pool motion, temperature variation and dendritic morphology of Inconel 718 during pulsed-and continuous-wave laser additive manufacturing: A comparative study," *Materials and Design*, 119:351-360 (Jan. 23, 2017).
Litvin et al., "Beam shaping laser with controllable gain," *Appl. Phys. B*, 123:174-1-174-5 (May 24, 2017).
Liu et al., "Femtosecond laser additive manufacturing of YSZ," *Appl. Phys. A*, 123:293-1-293-8 (Apr. 1, 2017).
Longhi et al., "Self-focusing and nonlinear periodic beams in parabolic index optical fibres," *J. Opt. B: Quantum Semiclass. Opt.*, 6:S303-S308 (May 2004).
Ludtke, et al., "Calibration of Galvanometric Laser Scanners Using Statistical Learning Methods," Bildverabeitung für die Medizin, pp. 467-472 (Feb. 25, 2015).
Maechling et al., "Sum Frequency Spectra in the C—H Stretch Region of Adsorbates on Iron," *Appl. Spectrosc.*, 47:167-172 (Feb. 1, 1993).
Malinauskas et al., "Ultrafast laser processing of materials: from science to industry," *Official Journal of the CIOMP, Light: Science & Applications*, 5:1-14 (2016).
Manakov, et al., "A Mathematical Model and Calibration Procedure for Galvanometric Laser Scanning Systems," Vision, Modeling, and Visualization, 8 pages (Jan. 2011).
Martins et al., "Modeling of Bend Losses in Single-Mode Optical Fibers," 7th Conference on Telecommunications, 4 pages (Jan. 2009).
Masoomi et al., "Quality part production via multi-laser additive manufacturing," *Manufacturing Letters*, 13:15-20 (May 27, 2017).
Matthews et al., "Diode-based additive manufacturing of metals using an optically-addressable light valve," *Optics Express*, 25:11788-11800 (May 15, 2017).
McComb et al., "Pulsed Yb:fiber system capable of >250 kW peak power with tunable pulses in the 50 ps to 1.5 ns range," *Proc. of SPIE*, 8601:86012T-1-86012T-11 (Mar. 22, 2013).
Meier et al., "Thermophysical Phenomena in Metal Additive Manufacturing by Selective Laser Melting: Fundamentals, Modeling, Simulation and Experimentation," available at: http://arxiv.org/pdf/1709.09510v1, pp. 1-59 (Sep. 4, 2017).
Messerly et al., "Field-flattened, ring-like propagation modes," *Optics Express*, 21:12683-12698 (May 16, 2013).
Messerly et al., "Patterned flattened modes," *Optics Letters*, 38:3329-3332 (Sep. 1, 2013).
Moore et al., "Diode-bar side pumping of double-clad fibers," *Proc. of SPIE*, 6453:64530K-1-64530K-9 (Feb. 20, 2007).
Morales-Delgado et al., "Three-dimensional microfabrication through a multimode optical fiber," available at: http://arxiv.org, 20 pages (2016).
Morales-Delgado et al., "Three-dimensional microfabrication through a multimode optical fiber," *Optics Express*, 25:7031-7045 (Mar. 20, 2017).
Mumtaz et al., "Selective Laser Melting of thin wall parts using pulse shaping," *Journal of Materials Processing Technology*, 210:279-287 (2010).
Naidoo et al., "Improving the laser brightness of a commercial laser system," *Proc. of SPIE*, 10036:100360V-1-100360V-8 (Feb. 3, 2017).

Nazemosadat et al., "Saturable absorption in multicore fiber couplers," *J. Opt. Soc. Am. B*, 30:2787-2790 (Nov. 2013).
Neilson et al., "Free-space optical relay for the interconnection of multimode fibers," *Applied Optics*, 38:2291-2296 (Apr. 10, 1999).
Neilson et al., "Plastic modules for free-space optical interconnects," *Applied Optics*, 37:2944-2952 (May 10, 1998).
Neuhauser et al., "State-to-State Rates for the $D+H_2(v=1, j=1) \rightarrow HD(v', j')+H$ Reaction: Predictions and Measurements," *Science*, 257:519-522 (Jul. 24, 1992).
Ngcobo et al., "A digital laser for on-demand laser modes," *Nature Communications*, 4:1-6 (Aug. 2, 2013).
Ngcobo et al., "The digital laser," available at: http://arxiv.org, pp. 1-9 (2013).
Okunkova et al., "Development of laser beam modulation assets for the process productivity improvement of selective laser melting," *Procedia IUTAM*, 23:177-186 (2017).
Okunkova et al., "Experimental approbation of selective laser melting of powders by the use of non-Gaussian power density distributions," *Physics Procedia*, 56:48-57 (2014). (2017).
Okunkova et al., "Study of laser beam modulation influence on structure of materials produced by additive manufacturing," *Adv. Mater. Lett.*, 7:111-115 (2016).
Olsen, "Laser metal cutting with tailored beam patterns," available at: https://www.industrial-lasers.com/articles/print/volume-26/issue-5/features/laser-metal-cutting-with-tailored-beam-patterns.html, 8 pages (Sep. 1, 2011).
"Optical Tweezers & Micromanipulation: Applications Hamamatsu Photonics," available at: http://www.hamamatsu.com/jp/en/community/lcos/aplications/optical.html, archived: Mar. 27, 2015, 3 pages.
PCI-6110, Multifunction I/O Device, http://www.ni.com/en-us-support/model.pci-6110.html, downloaded Dec. 15, 2017, 1 page.
Pinkerton, "Lasers in Additive Manufacturing," *Optics & Laser Technology*, 78:25-32 (2016).
Prashanth et al., "Is the energy density a reliable parameter for materials synthesis by selective laser melting?" *Mater. Res. Lett.*, 5:386-390 (2017).
Price et al., "High-brightness fiber-coupled pump laser development," *Proc. of SPIE*, 7583:758308-1-758308-7 (Feb. 2010).
Product Brochure entitled "3-Axis and High Power Scanning" by Cambridge Technology, 4 pages, downloaded Dec. 21, 2013.
Product Brochure supplement entitled "Theory of Operation" by Cambridge Technology, 2 pages, downloaded Dec. 21, 2013.
Purtonen, et al., "Monitoring and Adaptive Control of Laser Processes," *Physics Procedia, Elsevier, Amsterdam, NL*, 56(9):1218-1231 (Sep. 9, 2014).
Putsch et al., "Active optical system for advanced 3D surface structuring by laser remelting," *Proc. of SPIE*, 9356:93560U-1-93560U-10 (Mar. 9, 2015).
Putsch et al., "Active optical system for laser structuring of 3D surfaces by remelting," *Proc. of SPIE*, 8843:88430D-1-88430D-8 (Sep. 28, 2013).
Putsch et al., "Integrated optical design for highly dynamic laser beam shaping with membrane deformable mirrors," *Proc. of SPIE*, 10090:1009010-1-1009010-8 (Feb. 20, 2017).
Raghavan et al., "Localized melt-scan strategy for site specific control of grain size and primary dendrite arm spacing in electron beam additive manufacturing," *Acta Materialia*, 140:375-387 (Aug. 30, 2017).
Rashid et al., "Effect of scan strategy on density and metallurgical properties of 17-4PH parts printed by Selective Laser Melting (SLM)," *Journal of Materials Processing Tech.*, 249:502-511 (Jun. 19, 2017).
Ren et al., "Resonant coupling in trenched bend-insensitive optical fiber," *Optics Letters*, 38:781-783 (Mar. 1, 2013).
Rinnen et al., "Construction of a Shuttered Time-of-Flight Mass Spectrometer for Selective Ion Detection," *Rev. Sci. Instrum.*, 60:717-719 (Apr. 1989).
Rinnen et al., "Effect of Indistinguishable Nuclei on Product Rotational Distributions: $D+DI \rightarrow D_2+I$," *Chem. Phys. Lett.*, 169:365-371 (Jun. 15, 1990).
Rinnen et al. "Quantitative Determination of HD Internal State Distributions via (2+1) REMPI," *Isr. J. Chem.*, 29:369-382 (Mar. 7, 1989).

(56) References Cited

OTHER PUBLICATIONS

Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).

Rinnen et al., "The H+$D_2$ Reaction: 'Prompt' HD Distributions at High Collision Energies," *Chem. Phys. Lett.*, 153:371-375 (Dec. 23, 1988).

Rinnen et al., "The H+$D_2$ Reaction: Quantum State Distributions at Collision Energies of 1.3 and 0.55 eV," *J. Chem. Phys.*, 91:7514-7529 (Dec. 15, 1989).

Roehling et al., "Modulating laser intensity profile ellipticity for microstructural control during metal additive manufacturing," *Acta Materialia*, 128:197-206 (2017).

Romero et al., "Lossless laser beam shaping," *J. Opt. Soc. Am. A*, 13:751-760 (Apr. 1996).

Rosales-Guzman et al., "Multiplexing 200 modes on a single digital hologram," available at: http://arxiv.org/pdf/1706.06129v1, pp. 1-14 (Jun. 19, 2017).

Russell, "Photonic-Crystal Fibers," *IEEE JLT*, 24:4729-4749 (Dec. 2006).

Saint-Pierre et al., "Fast uniform micro structuring of DLC surfaces using multiple ultrashort laser spots through spatial beam shaping," *Physics Procedia*, 83:1178-1183 (2016).

Salceda-Delgado et al., "Compact fiber-optic curvature sensor based on super-mode interference in a seven-core fiber," *Optics Letters*, 40:1468-1471 (Apr. 1, 2015).

Saleh et al., "Chapter 9.4 Holey and Photonic-Crystal Fibers," *Fundamentals of Photonics, Second Edition*, pp. 359-362 (2007).

Sames et al., "The metallurgy and processing science of metal additive manufacturing," *International Materials Reviews*, pp. 1-46 (2016).

Sanchez-Rubio et al., "Wavelength Beam Combining for Power and Brightness Scaling of Laser Systems," *Lincoln Laboratory Journal*, 20:52-66 (2014).

Saracco et al., "Compact, 17 W average power, 100 kW peak power, nanosecond fiber laser system," *Proc. of SPIE*, 8601:86012U-1-86012U-13 (Mar. 22, 2013).

Sateesh et al., "Effect of Process Parameters on Surface Roughness of Laser Processed Inconel Superalloy," *International Journal of Scientific & Engineering Research*, 5:232-236 (Aug. 2014).

Schrader et al., "Fiber-Based Laser with Tunable Repetition Rate, Fixed Pulse Duration, and Multiple Wavelength Output," *Proc. of the SPIE*, 6453:64530D-1-64530D-9 (Feb. 20, 2007).

Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).

Schrader et al., "Power scaling of fiber-based amplifiers seeded with microchip lasers," *Proc. of the SPIE*, 6871:68710T-1-68710T-11 (Feb. 2008).

Schulze et al., "Mode Coupling in Few-Mode Fibers Induced by Mechanical Stress," *Journal of Lightwave Technology*, 33:4488-4496 (Nov. 1, 2015).

Search Report from the Taiwan Intellectual Property Office for related Application No. 102139285, 21 pages, dated Sep. 1, 2015 (with English translation).

Search Report from the Taiwan Intellectual Property Office for related Application No. 102139285, 9 pages, dated Sep. 4, 2017 (with English translation).

SeGall et al., "Simultaneous laser mode conversion and beam combining using multiplexed volume phase elements," Advanced Solid-State Lasers Congress Technical Digest, Optical Society of America, paper AW2A.9, 3 pages (Oct. 27-Nov. 1, 2013).

Sheehan et al., "Faserlaser zur Bearbeitung hochreflektierender Materialien (Fiber laser processing of highly reflective materials)," *Laser*, 3:92-94 (Jun. 2017).

Sheehan et al. "High-brightness fiber laser advances remote laser processing," *Industrial Laser Solutions*, 31:1-9 (Nov. 2, 2016).

Shusteff et al., "One-step volumetric additive manufacturing of complex polymer structures," *Sci. Adv.*, 3:1-7 (Dec. 8, 2017).

Skutnik et al., "Optical Fibers for Improved Low Loss Coupling of Optical Components," *Proc. of SPIE, Photon Processing in Microelectronics and Photonics III*, 6 pages (Jul. 15, 2004).

Smith et al., "Tailoring the thermal conductivity of the powder bed in Electron Beam Melting (EBM) Additive Manufacturing," *Scientific Reports*, 7:1-8 (Sep. 5, 2017).

Spears et al., "In-process sensing in selective laser melting (SLM) additive manufacturing," *Integrating Materials and Manufacturing Innovation*, 5:2-25 (2016).

Sun et al., "Optical Surface Transformation: Changing the optical surface by homogeneous optic-null medium at will," *Scientific Reports*, 5:16032-1-16032-20 (Oct. 30, 2015).

Sundqvist et al., "Analytical heat conduction modelling for shaped laser beams," *Journal of Materials Processing Tech.*, 247:48-54 (Apr. 18, 2017).

Supplementary European Search Report for Application No. EP 17741945.4, 5 pages, dated Nov. 16, 2018.

Thiel et al., "Reliable Beam Positioning for Metal-based Additive Manufacturing by Means of Focal Shift Reduction," Lasers in Manufacturing Conference 2015, 8 pages (2015).

Tofail et al., "Additive manufacturing: scientific and technological challenges, market uptake and opportunities," *Materials Today*, pp. 1-16 (2017).

Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).

Tominaga et al., "Ultrafast Studies of Intervalence Charge Transfer," *Ultrafast Phenomena VIII*, (Springer-Verlag, New York), pp. 582-584 (1993).

Trapp et al., "In situ absorptivity measurements of metallic powders during laser powder-bed fusion additive manufacturing," *Applied Materials Today*, 9:341-349 (2017).

"Triple Clad Ytterbium-Doped Polarization Maintaining Fibers," nuFERN Driven to Light Specifications, 1 page (Jan. 2006).

Ulmanen, "The Effect of High Power Adjustable Ring Mode Fiber Laser for Material Cutting," M.S. Thesis, Tampere University of Technology, 114 pages (May 2017).

"Uni 42 A," Curvatubi elettrica digitale, 5 pages (2016).

"Uni 60 Combi 2," Frame-Grab of YouTube Video, 1 page (Sep. 26, 2011).

Valdez et al., "Induced porosity in Super Alloy 718 through the laser additive manufacturing process: Microstructure and mechanical properties," *Journal of Alloys and Compounds*, 725:757-764 (Jul. 22, 2017).

Van Newkirk et al., "Bending sensor combining multicore fiber with a mode-selective photonic lantern," *Optics Letters*, 40:5188-5191 (Nov. 15, 2015).

Varshney et al., "Design of a flat field fiber with very small dispersion slope," Optical Fiber Technology, 9(3):189-198 (Oct. 2003).

Villatoro et al., "Ultrasensitive vector bending sensor based on multicore optical fiber," *Optics Letters*, 41:832-835 (Feb. 15, 2016).

Wang et al., "Selective laser melting of W—Ni—Cu composite powder: Densification, microstructure evolution and nanocrystalline formation," *International Journal of Refractory Metals & Hard Materials*, 70:9-18 (Sep. 9, 2017).

Website describing 3-Axis Laser Scanning Systems at http://www.camtech.com/index.php?option=com_content&view=article&id=131&Itemid=181, 4 pages, accessed Dec. 31, 2014.

Wetter et al., "High power cladding light strippers," Proc. of SPIE, 6873:687327-1-687327-8 (Jan. 21, 2008).

Wilson-Heid et al., "Quantitative relationship between anisotropic strain to failure and grain morphology in additively manufactured Ti—6Al—4V," *Materials Science & Engineering A*, 706:287-294 (Sep. 6, 2017).

Wischeropp et al., "Simulation of the effect of different laser beam intensity profiles on heat distribution in selective laser melting," Laser in Manufacturing Conference 2015, 10 pages (2015).

Xiao et al., "Effects of laser modes on Nb segregation and Laves phase formation during laser additive manufacturing of nickel-based superalloy," *Materials Letters*, 188:260-262 (Nov. 1, 2016).

Xiao et al., "Fiber coupler for mode selection and high-efficiency pump coupling," *Optics Letters*, 38:1170-1172 (Apr. 1, 2013).

(56) References Cited

OTHER PUBLICATIONS

Xie et al., "Correction of the image distortion for laser galvanometric scanning system," *Optics & Laser Technology*, 37:305-311 (Jun. 2005).

Xu et al, "The Influence of Exposure Time on Energy Consumption and Mechanical Properties of SLM-fabricated Parts," 2017 Annual International Solid Freeform Fabrication Symposium, 7 pages (2017)—Abstract only.

Yan et al., "Formation mechanism and process optimization of nano $Al_2O_3$—$ZrO_2$ eutectic ceramic via laser engineered net shaping (LENS)," *Ceramics International*, 43:1-6 (2017).

Yaney et al., "Distributed-Feedback Dye Laser for Picosecond UV and Visible Spectroscopy," *Rev. Sci. Instrum*, 71:1296-1305 (Mar. 2000).

Ye et al., "Mold-free fs laser shock micro forming and its plastic deformation mechanism," *Optics and Lasers in Engineering*, 67:74-82 (2015).

Yu, "Laser Diode Beam Spatial Combining," Ph.D. Thesis, Politecnico di Torino, 106 pages (Jun. 6, 2017).

Yu et al., "1.2-kW single-mode fiber laser based on 100-W high-brightness pump diodes," *Proc. of SPIE*, 8237:82370G-1-82370G-7 (Feb. 16, 2012).

Yu et al., "Development of a 300 W 105/0.15 fiber pigtailed diode module for additive manufacturing applications," *Proc. of SPIE*, 10086:100860A-1-100860A-5 (Feb. 22, 2017).

Yu et al., "Laser material processing based on non-conventional beam focusing strategies," 9th International Conference on Photonic Technologies LANE 2016, pp. 1-10 (2016).

Yusuf et al., "Influence of energy density on metallurgy and properties in metal additive manufacturing," *Materials Science and Technology*, 33:1269-1289 (Feb. 15, 2017).

Zavala-Arredondo et al., "Diode area melting single-layer parametric analysis of 316L stainless steel powder," *Int. J. Adv. Manuf. Technol.*, 94:2563-2576 (Sep. 14, 2017).

Zavala-Arredondo et al., "Laser diode area melting for high speed additive manufacturing of metallic components," *Materials and Design*, 117:305-315 (Jan. 3, 2017).

Zhang et al., "Switchable multiwavelength fiber laser by using a compact in-fiber Mach-Zehnder interferometer," *J. Opt.*, 14:1-5 (2012).

Zheng et al., "Bending losses of trench-assisted few-mode optical fibers," *Applied Optics*, 55:2639-2648 (Apr. 1, 2016).

Zhirnov et al., "Laser beam profiling: experimental study of its influence on single-track formation by selective laser melting," *Mechanics & Industry*, 16:709-1-709-6 (2015).

Zhu et al., "Effect of processing parameters on microstructure of laser solid forming Inconel 718 superalloy," *Optics and Laser Technology*, 98:409-415 (Sep. 5, 2017).

Zhu et al., "Gaussian beam shaping based on multimode interference," *Proc. of SPIE, Laser Resonators and Beam Control XII*, 7579:75790M-1-75790M-11 (2010).

Zlodeev et al., "Transmission spectra of a double-clad fibre structure under bending," *Quantum Electronics*, 48:535-541 (2013).

Zou et al., "Adaptive laser shock micro-forming for MEMS device applications," *Optics Express*, 25:3875-3883 (Feb. 20, 2017).

\* cited by examiner

HIGH-POWER, SINGLE-MODE FIBER SOURCES

CROSS REFERENCE TO RELATED APPLICATIONS

This application is a continuation of U.S. patent application Ser. No. 15/810,506, filed Nov. 13, 2017, which is a continuation of U.S. patent application Ser. No. 15/004,680, filed Jan. 22, 2016, now issued as U.S. Pat. No. 9,837,783, which claims the benefit of U.S. Provisional Patent Application No. 62/108,015, filed Jan. 26, 2015, all of which are incorporated by reference herein in their entirety.

FIELD

The disclosure pertains to high-power single-mode fiber lasers and amplifiers.

BACKGROUND

Power scaling of high average power fiber sources tends to be limited by pump powers launched into a gain fiber of the fiber source and by the onset of nonlinear optical processes in the fiber. Addressing these limitations often requires balancing conflicting design goals resulting in compromises that negatively impact system performance with regard to total output power, beam quality, wall-plug efficiency, reliability, cost, complexity, and/or manufacturability. The power scaling problems tend to be particularly acute for sources capable of producing single-mode output beams, which are highly desirable for a variety of applications, as output beam powers approach about 1 kW and greater.

SUMMARY

According to one aspect, an optical apparatus includes one or more pump sources situated to provide laser pump light, and a gain fiber optically coupled to the one or more pump sources, the gain fiber including an actively doped core situated to produce an output beam, an inner cladding and outer cladding surrounding the doped core and situated to propagate pump light, and a polymer cladding surrounding the outer cladding and situated to guide a selected portion of the pump light coupled into the inner and outer claddings of the gain fiber.

According to another aspect, a method of pumping a high power fiber source includes generating pump light at a pump wavelength from one or more pump sources, coupling the pump light into a glass inner cladding and a glass outer cladding of a gain fiber of the fiber source such that a portion of the pump light is guided by a polymer cladding surrounding the glass outer cladding, and generating a single-mode output beam from the gain fiber.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index difference, and a cladding NA is associated with an inner cladding/outer cladding refractive index difference. For an optical fiber having a core refractive index $n_{core}$ and a cladding index $n_{clad}$, a fiber core NA is $NA=\sqrt{n_{core}^2-n_{clad}^2}$. For an optical fiber with an inner core and an outer core adjacent the inner core, a cladding NA is $NA=\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

The term brightness is used herein to refer to optical beam power per unit area per solid angle. In some examples, optical beam power is provided with one or more laser diodes that produce beams whose solid angles are proportional to beam wavelength and beam area. Selection of beam area and beam solid angle can produce pump beams that couple selected pump beam powers into one or more core or cladding layers of double, triple, or other multi-clad optical fibers.

Figure 1A:
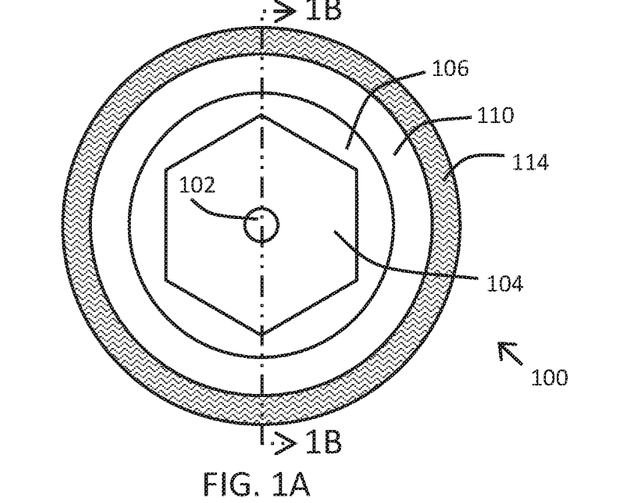
FIG. 1A is a cross-sectional view of a representative gain fiber.
Figure 1B:
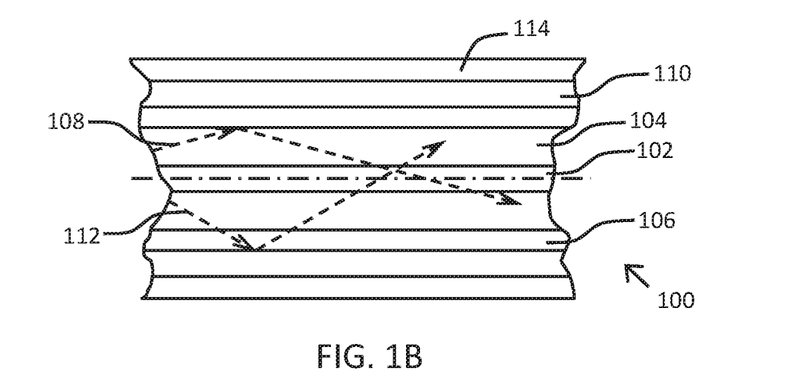
FIG. 1B is side cross-sectional view of the representative gain fiber of FIG. 1A.
Figure 1C:
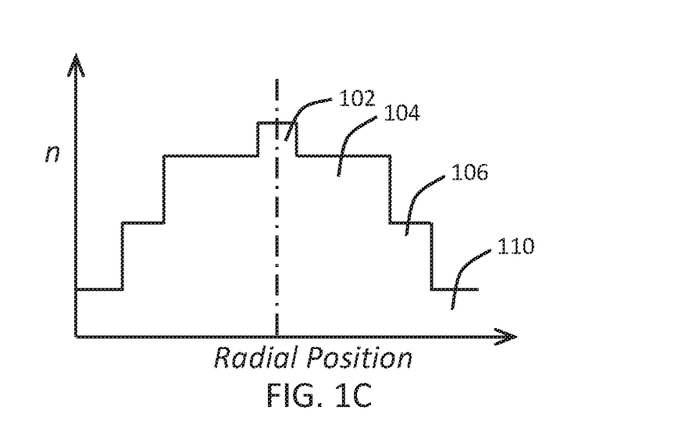
FIG. 1C is a refractive index profile of the fiber cross-section of FIGS. 1A-1B.

FIGS. 1A-1B and 1C are cross-sectional diagrams of a representative triple-clad optical gain fiber 100 and an associated refractive index profile, respectively. The optical gain fiber 100 includes a core 102 doped with active ions, such as ytterbium, erbium, other rare earth elements, or other elements suitable for optical gain. A glass inner cladding 104 surrounds the core 102 and has a refractive index suitably lower than the core 102 so as to guide laser light generated in the core 102 to propagate along a core axis through total internal reflection. A glass outer cladding 106 surrounds the glass inner cladding 104 and has a refractive index suitably lower than the inner cladding 104 so as confine laser pump light, shown with representative ray 108, of particular NAs to propagate in glass inner cladding 104 including through core 102. A low index polymer cladding 110 surrounds the glass outer cladding 106 and has a refractive index suitably lower than the outer cladding 106 so as to also guide laser pump light of larger NAs than the pump light guided within the glass cladding 104. Such pump light, shown with representative ray 112, is thus guided to propagate in the outer and inner glass claddings 104, 106, including through the core 102. Guided pump light traversing the core 102, produces excited states in the active dopants so as to provide optical gain. Such gain can result in an output beam which generally propagates in the core 102. A sleeving 114 or other material can be situated to surround the polymer cladding 110 in order to protect the fiber 100 from damage.

Various parameters of the gain fiber 100 are selected such that pump light coupled into the gain fiber 100 is partitioned between a glass-guided region associated with the inner cladding 104 and a polymer-guided region associated with the outer cladding 106. In this way, representative output beam powers associated with the gain fiber 100 can be scaled to 1 kW or more while maintaining system reliability, manufacturability, and single-mode operation, without difficult manufacturing tolerances, precise control or adjustment of the gain fiber bend radius, or other onerous packaging constraints. Gain fibers such as the gain fiber 100 enable power scaling of single-mode fiber sources to 1 kW or more using simple pump sources. Accordingly, such higher power single-mode fiber sources can be made available with a level of reliability, manufacturability, stability, and practicality typically associated with lower-power single-mode and multi-mode fiber sources. While generally circular and hexagonal cladding cross-sections are depicted in FIGS. 1A-1B, it will be appreciated that other cross-sections can be used for the different claddings, including square, octagonal, elliptical, oval, etc., including different shapes for different claddings. It will also be appreciated that while uniformly flat and sharp step refractive index profiles are depicted, other refractive index variations can be provided, including variations at cladding boundaries or within claddings. Also, other elements or regions can be disposed in the fiber 100, such as stress rods or other polarization-maintaining elements, and one or more additional dopants. Cladding cross-sections can also be non-symmetric. For example, inner cladding 104 or outer cladding 106 (or both) can be offset from the center of the core 102.

In representative examples, core 102 is doped with ytterbium for laser output at about 1080 nm and has a diameter of about 13 μm for robust single-mode beam quality. Corresponding beam parameter products of associated beams are generally less than 0.4 mm-mrad, corresponding to an $M^2$ of about 1.2 or better. A single-mode output beam power of about 1.5 kW can be obtained using around 2 kW of pump power. Up to 800 W of pump power can be selected to become guided to propagate in the outer cladding 106 by the low index polymer cladding 110, though this amount can be larger or smaller depending on the selection of other fiber properties, such as fiber length, core size, cladding diameters, as well as other factors, such as factory cleanliness, manufacturing process maturity and control, tooling and equipment quality, operator skill level, etc. In some examples, 5%, 20%, 40%, or more of pump light is guided by the low index polymer cladding 110. In some examples, a polymer cladding is omitted and an outer cladding/air interface defines the outer cladding NA.

While the core 102 of gain fiber 100 can generally be selected to be single-mode, in some examples or multimode or few-mode cores can be used. In such cores, the core diameter and associated NA can be chosen such that single-mode operation is provided by way of preferential gain for the fundamental mode or loss of higher order modes (or both) with typical fiber tolerances and packaging and corresponding coiling dimensions. That is, careful control of fiber specifications or careful limitations on packaging for optimization of bend radius are of less concern in achieving single-mode performance, leading to fewer design constraints or compromises.

The diameters of the inner cladding 104 and outer cladding 106 and the amount of pump light partitioned between the inner cladding 104 and the outer cladding 106 can depend on the brightness of the pump light coupled to the gain fiber 100. For example, for a given cladding diameter, brighter pumps will have a larger fraction of the total pump power coupled into the lower NA glass inner cladding 104. In representative examples of gain fiber 100, the core 102 is actively doped silica with an NA less than about 0.08, glass inner cladding 104 is silica with an NA of about 0.23, and the glass outer cladding 106 is fluorosilicate glass which captures light with an NA of about 0.46 due to the presence of the low index polymer 110 which can be fluoroacrylate. Selection of the various cladding diameters can be a multi-dimensional optimization and depend on system details, including the desired output power of the system, available pump brightness, core design, manufacturing capability, etc. In representative examples, inner cladding diameters can be in the range of 200-250 µm and outer cladding diameters can be selected in the range of 220-300 µm.

However, by utilizing the selective partitioning of pump power described herein, a sufficiently small glass outer cladding diameter can be provided, which leads to sufficient pump absorption in the already small core so that a suitable short fiber length can be used in the generation of output powers which can exceed 1 kW before the onset of detrimental nonlinear processes. That is, the fiber length parameter is often determined by absorption of pump light in the core which is most typically determined by the ratio of core and cladding cross-sectional areas. Increased pump absorption can be obtained by increasing core diameter at the expense of losing single-mode output, or by increasing fiber length but at the expense of generating nonlinear processes. For pumping Yb gain fiber, one conventional approach is to use pump light with a lower quantum defect, i.e., a wavelength closer to the output wavelength, such as 980 nm. However, since only a fraction of the pump power is guided by the polymer cladding 110 in accordance with aspects of embodiments herein, high brightness, high-reliability 915 nm pump sources can be used to generate 1 kW or more in a single-mode output beam without resorting to less reliable or more expensive pump technology. Nonlinear processes typically include stimulated Raman scattering (SRS), stimulated Brillouin scattering (SBS), self-phase modulation (SPM), and four-wave mixing (FWM). In some examples, the length of the gain fiber can be selected to be sufficiently short due to the partitioning of pump power that out-of-band power associated with the generation of optical nonlinearities is 20% or less than the power of the output beam. In additional examples it is 5% or less, 1% or less, or substantially zero.

In accordance with examples herein, for a given core design, the resultant pump absorption per unit length is significantly higher, and a corresponding gain fiber length can be significantly shorter, than it would be if substantially all of the pump light was guided by the glass outer cladding 106. As a result, the diameter of the core 102 can be selected so that single-mode operation of the high power output beam is maintained. Thus, the power-handling benefits of glass clad fibers can be obtained without the customary single-mode power scaling limit associated therewith. Given the brightnesses available with modern pump sources, fiber source output powers of greater than 1 kW are achievable while maintaining a sufficiently small core diameter for robust single-mode operation even when pumping at practical wavelengths such as 900-940 nm, 910-930 nm, or 915 nm. In representative gain fibers, fiber oscillator lengths can be in the range of 10-30 m. When used with a pump combiner, typical pump sources produce pump beams having NAs suitable for coupling power in the fiber cores as well as inner claddings and outer claddings.

Figure 2:
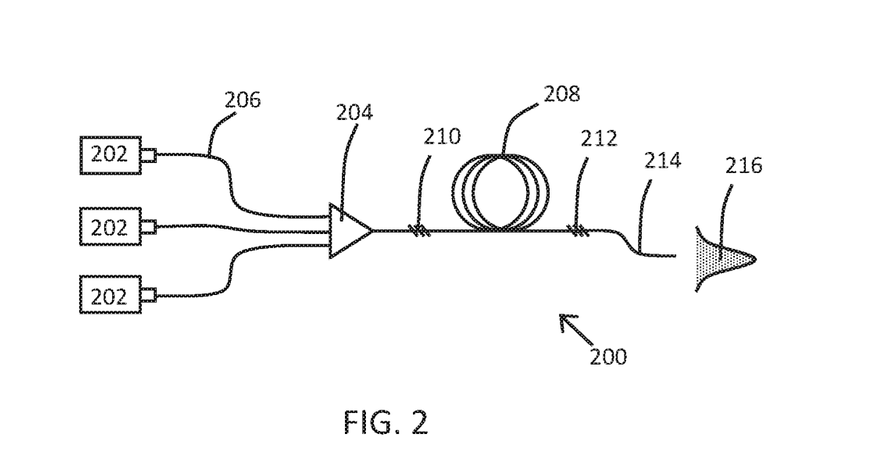
FIG. 2-5 show schematics of representative embodiments of fiber sources.

Referring to FIG. 2, a representative fiber laser system 200 includes a plurality of pump sources 202 coupled to a pump combiner 204 with pump delivery fibers 206. Pump sources 202 can each provide the same pump output power and brightness or they can be different. The pump combiner 204 is operable to combine the incident pump light from the pump sources 202 in a combined pump output with a selected NA profile. The combined pump output is optically coupled to a single-mode gain fiber 208. The gain fiber 208 is disposed between fiber Bragg gratings 210, 212 each having reflectivities selected to provide laser operation at the laser wavelength associated with the active elements in the gain fiber core. For example, the grating 210 can have a high reflectivity at the laser wavelength, such as 90%, 95%, 99%, or higher. The grating 212 is operable as the output coupler for the gain fiber 208 and can have a reflectivity associated with a desired laser output power. A delivery fiber 214 is coupled to the gain fiber 208 and can be used to deliver a high power single-mode output beam 216 to a target. The parameters of the gain fiber 208 are selected such that the pump power coupled into the gain fiber 208 is partitioned between being guided by an outer cladding and being guided by a low index cladding, such as a polymer cladding, surrounding the outer cladding.

Figure 3:
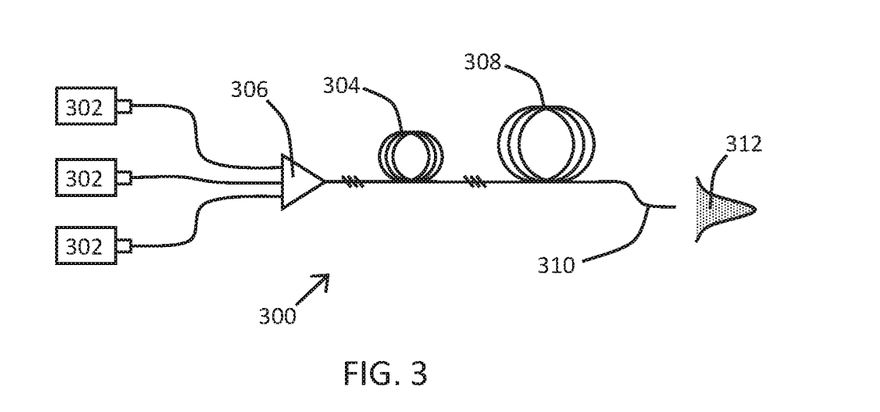

As shown in FIG. 3, a fiber laser system 300 includes a plurality of pump sources 302 of selected NA coupled to a fiber oscillator gain fiber 304 with a pump combiner 306. The output of the gain fiber 304 can then be amplified with a subsequent fiber amplifier gain fiber 308 so that the fiber laser system 300 operates in a master-oscillator power amplifier configuration. A delivery fiber 310 is coupled to the fiber amplifier gain fiber 308 so as to receive an amplified single-mode output beam 312 for subsequent delivery to a target or for subsequent application in larger laser systems, such as becoming combined in a single-mode fiber combiner. The fiber oscillator gain fiber 304 and fiber amplifier gain fiber 308 include glass inner and outer claddings surrounding respective doped cores so that pump light is partitioned to achieve high power single-mode output.

Figure 4:
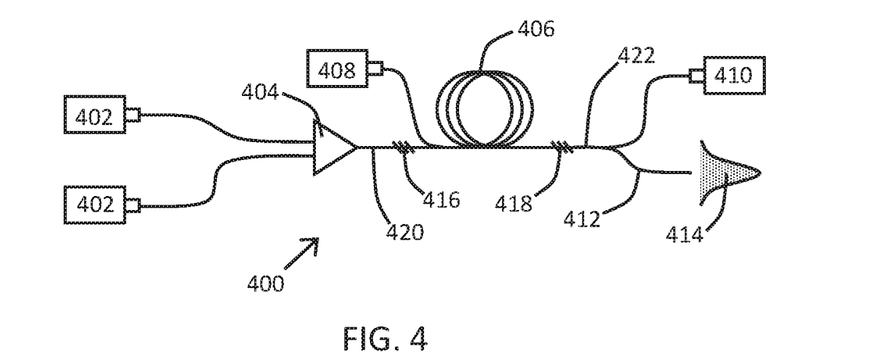

Referring to FIG. 4, a fiber laser system 400 includes a plurality of pump sources 402 coupled to a pump combiner 404 so as to couple pump light therefrom into an input end 420 of a fiber oscillator gain fiber 406. One or more additional pump sources 408 are coupled into the gain fiber 406, e.g., by splice or pump combiner, between fiber Bragg gratings 416, 418. One or more additional pump sources 410 are coupled into the gain fiber 406 through an output end 422 of the gain fiber 406. A delivery fiber 412 provides a high power single-mode output beam 414 for subsequent laser beam application. The parameters of the gain fiber 406 are selected and the pump power NA is selected such that for the pump power coupled into the gain fiber 208 a portion of the pump power is guided by an outer cladding and another portion is guided by a lower index cladding surrounding the outer cladding.

Figure 5:
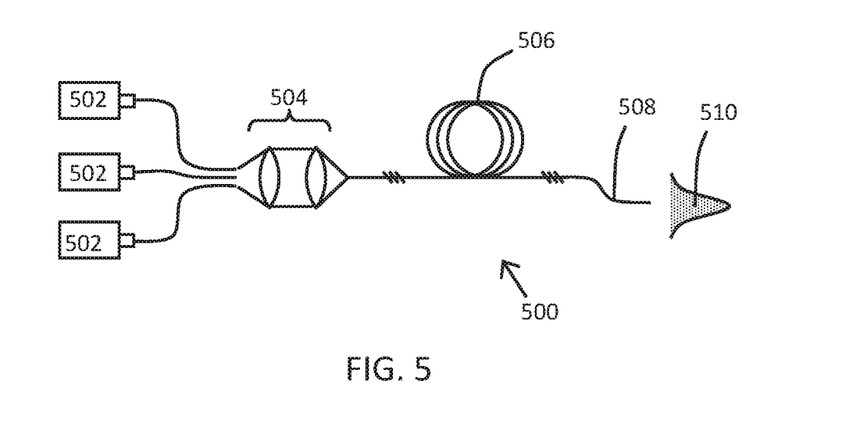

With reference to FIG. 5, a fiber laser system 500 includes a plurality of pump sources 502 which are free-space coupled with optics 504 into a gain fiber 506. A delivery fiber 508 is coupled to the gain fiber 506 and is situated to delivery a high power single-mode output beam 510 for subsequent application. The parameters of the gain fiber 506 and pump light NA coupled therein are selected such that a portion of the pump power is guided by an outer cladding and another portion is guided by a lower index cladding surrounding the outer cladding.

Figure 6:
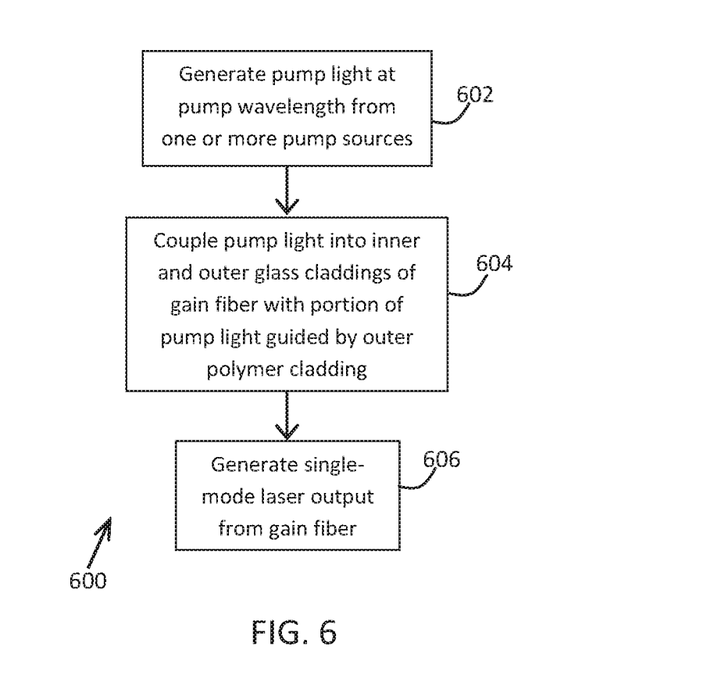
FIG. 6 is a flowchart of a representative method of pumping a gain fiber.

FIG. 6 is a flowchart showing an example of a representative method 600 of providing high power laser beams. At 602, pump light is generated at a pump wavelength from one or more pump sources. Pump wavelengths of relatively large quantum defect can be selected, such as pump wavelengths shorter than about 930 nm for gain above 1050 nm. At 604, pump light is coupled into a glass inner cladding and glass outer cladding of a gain fiber so that a significant portion of the pump power propagates in an outer cladding situated about an inner cladding surrounding a doped core. Typically, a low index polymer cladding surrounding the outer glass cladding at least partially defines an outer cladding NA. At 606, a high power single-mode laser output beam is generated from the gain fiber. Single-mode output beams produced in this way can have powers of 1 kW or more and without the disadvantages of conventional approaches.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. A method of pumping a high power fiber source, comprising:
    generating pump light at a pump wavelength from one or more pump sources;
    coupling the pump light into a glass inner cladding surrounding an actively doped core and a glass outer cladding surrounding the glass inner cladding of a gain fiber such that a portion of the pump light is guided by a polymer cladding surrounding the glass outer cladding;
    wherein a length of the gain fiber corresponds to deferred onset of out-of-band optical nonlinearities until reaching an output power of 1 kW or greater and wherein the length correlates to a proportion of the pump light that is guided by the polymer cladding; and
    generating a single-mode output beam from the gain fiber.

2. The method of claim 1, wherein the proportion of the pump light guided by the polymer cladding correlates further to the glass outer cladding diameter and pump light absorption in the actively doped core.

3. The method of claim 1, wherein the pump light wavelength has a relatively large quantum defect with respect to an output wavelength.

4. The method of claim 1, wherein the length of the gain fiber limits generation of out of band optical nonlinearities to 20% or less than the power of the output beam.

* * * * *